(12) United States Patent
Ziemer

(10) Patent No.: US 6,991,578 B2
(45) Date of Patent: Jan. 31, 2006

(54) MULTISTEP GEAR

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/473,199

(22) PCT Filed: Mar. 27, 2002

(86) PCT No.: PCT/EP02/03434

§ 371 (c)(1),
(2), (4) Date: Sep. 25, 2003

(87) PCT Pub. No.: WO02/079670

PCT Pub. Date: Oct. 10, 2002

(65) Prior Publication Data
US 2004/0097324 A1 May 20, 2004

(30) Foreign Application Priority Data
Mar. 30, 2001 (DE) ................................ 101 15 983

(51) Int. Cl.
*F16H 3/44* (2006.01)

(52) U.S. Cl. .................. 475/296; 475/271; 475/272; 475/275; 475/276; 475/277; 475/278

(58) Field of Classification Search ................ 475/271, 475/272, 275, 276, 277, 278, 296
See application file for complete search history.

(56) References Cited

U.S. PATENT DOCUMENTS

| | | | |
|---|---|---|---|
| 3,956,946 A * | 5/1976 | Murakami et al. .......... | 475/276 |
| 5,049,116 A | 9/1991 | Asada .......................... | 475/269 |
| 5,106,352 A | 4/1992 | Lepelletier .................... | 475/280 |
| 5,342,257 A | 8/1994 | Hotta et al. .................. | 475/275 |
| 5,599,251 A | 2/1997 | Beim et al. ................... | 475/275 |
| 6,053,839 A * | 4/2000 | Baldwin et al. .............. | 475/281 |
| 6,083,135 A | 7/2000 | Baldwin et al. .............. | 475/276 |
| 6,302,820 B1 | 10/2001 | Ried ............................ | 475/276 |
| 6,514,170 B1 * | 2/2003 | Kao et al. .................... | 475/296 |
| 6,558,287 B2 * | 5/2003 | Hayabuchi et al. .......... | 475/271 |
| 6,648,790 B2 * | 11/2003 | Raghavan et al. ........... | 475/280 |
| 6,723,018 B2 * | 4/2004 | Hayabuchi et al. .......... | 475/276 |
| 6,736,749 B2 * | 5/2004 | Bucknor et al. ............. | 475/275 |
| 2003/0162623 A1 * | 8/2003 | Raghavan et al. ........... | 475/276 |

FOREIGN PATENT DOCUMENTS

| | | |
|---|---|---|
| DE | 689 07 338 T2 | 11/1993 |
| DE | 690 10 472 T2 | 3/1995 |
| DE | 199 10 299 C1 | 4/2001 |

(Continued)

*Primary Examiner*—Rodney H. Bonck
*Assistant Examiner*—David D. Le
(74) *Attorney, Agent, or Firm*—Davis & Bujold, P.L.L.C.

(57) ABSTRACT

A multi-step gear including a drive shaft linked with a non-shiftable front-mounted gear train, an output shaft linked with a shiftable rear-mounted gear train with four free shafts, and shift elements for selective shifting without group shifts. The first free shaft of the rear gear train is linked with a first shift element, the second free shaft with second and third shift elements, the third free shaft with fourth and fifth shift elements and the fourth free shaft with the output shaft. With six shift elements, the first or third free shaft of the rear-mounted gear is additionally linked with a sixth shift element. With seven shift elements, the third free shaft is additionally linked with a sixth shift element and the first free shaft is additionally linked with a seventh shift element.

14 Claims, 17 Drawing Sheets

FOREIGN PATENT DOCUMENTS

| | | |
|---|---|---|
| DE | 199 49 507 A1 | 4/2001 |
| DE | 10115987 A1 * | 10/2002 |
| EP | 0 427 459 A1 | 11/1990 |
| EP | 1 013 968 A2 | 6/1999 |

* cited by examiner

| Speed | Closed Shifting Elements | | | | | | Transmission | Level | Spread |
|---|---|---|---|---|---|---|---|---|---|
| | A | B | C | D | E | D' | | | |
| 1 | O | | | O | | | 5,71 | 1,78 | |
| 2 | O | | O | | | | 3,21 | 1,35 | |
| 3 | O | | | | | O | 2,38 | 1,36 | |
| 4 | O | O | | | | | 1,75 | 1,33 | 7,6 |
| 5 | O | | | | O | | 1,32 | 1,32 | |
| 6 | | O | | | O | | 1,00 | 1,33 | |
| 7 | | | O | | O | | 0,75 | | |
| R | O | | O | | | | -3,00 | | |

Status Ratios $i_{\text{Planet g / Planet k}} = +1,45 = \varnothing_{12g} / \varnothing_{12k}$     $i_{0\,NS1} = +2,40$ $i_{0\,VS} = -2,00 = -\varnothing_{13} / \varnothing_{11}$     $i_{0\,NS2} = -3,00$ $i_{0\,VSges} = -1,38$

| Speed | Closed Shifting Elements | | | | | | Transmission | Level | Spread |
|---|---|---|---|---|---|---|---|---|---|
| | A | B | C | D | E | A' | | | |
| 1 | | | | O | | O | 5,45 | 1,80 | |
| 2 | | | O | | | O | 3,03 | 1,67 | |
| 3 | | O | | | | O | 1,82 | 1,49 | |
| 4 | O | O | | | | | 1,22 | 1,22 | 8,2 |
| 5 | O | | | | O | | 1,00 | 1,22 | |
| 6 | | O | | | O | | 0,82 | 1,22 | |
| 7 | | | O | | O | | 0,67 | | |
| R | | | | O | | | -3,64 | | |

Status Ratios $i_{0\,VS} = +2,22$ $i_{0\,NS1} = +3,00$ $i_{0\,NS2} = -2,00$

| Speed | Closed Shifting Elements | | | | | | Transmission | Level | Spread |
|---|---|---|---|---|---|---|---|---|---|
| | A | B | C | D | E | A' | | | |
| 1 | | | O | O | | | 4,79 | 1,74 | |
| 2 | O | | | O | | | 2,75 | 1,41 | |
| 3 | O | | O | | | | 1,95 | 1,40 | |
| 4 | O | O | | | | | 1,40 | 1,40 | 7,2 |
| 5 | O | | | | O | | 1,00 | 1,29 | |
| 6 | | O | | | O | | 0,77 | 1,16 | |
| 7 | | | O | | O | | 0,67 | | |
| R | | | | O | | O | -3,51 | | |

Status Ratios $i_{0\,VS}$ = + 2,41

$i_{0\,NS1}$ = − 1,75

$i_{0\,NS2}$ = − 3,40

Status Ratios $i_{0\,Vsges} = -1{,}41$ $i_{0\,VS} = -2{,}00 = -\varnothing_{13}/\varnothing_{11}$ $i_{Planet\,g}/Planet\,k = 1{,}42 = \varnothing_{12g}/\varnothing_{12k}$

| Speed | Closed Shifting Elements | | | | | | Transmission | Level | Spread |
|---|---|---|---|---|---|---|---|---|---|
| | A | B | C | D | E | A' | | | |
| 1 | | | O | O | | | 4,79 | 1,74 | |
| 2 | O | | | O | | | 2,75 | 1,41 | |
| 3 | O | | O | | | | 1,95 | 1,40 | |
| 4 | O | O | | | | | 1,40 | 1,40 | 7,2 |
| 5 | O | | | | O | | 1,00 | 1,29 | |
| 6 | | O | | | O | | 0,77 | 1,16 | |
| 7 | | | O | | | O | 0,67 | | |
| R | | | | O | | O | -3,51 | | |

Status Ratios $i_{0\,Vsges} = -1,41$    $i_{0\,NS1} = -2,51$ $i_{0\,VS} = -2,00 = -\varnothing_{13} / \varnothing_{11}$    $i_{0\,NS2} = -3,40$ $i_{Planet\,g\,/\,Planet\,k} = 1,42 = \varnothing_{12g} / \varnothing_{12k}$

| Speed | Closed Shifting Elements | | | | | | Transmission | Level | Spread |
|---|---|---|---|---|---|---|---|---|---|
| | A | B | C | D | E | A' | | | |
| 1 | | O | | | | O | 15,00 | 3,00 | |
| 2 | | | O | | | O | 5,00 | 1,67 | |
| 3 | O | | | O | | | 3,00 | 1,40 | |
| 4 | | | O | O | | | 2,14 | 1,29 | |
| 5 | O | | | O | | | 1,67 | 1,22 | 19,0 |
| 6 | O | | O | | | | 1,36 | 1,18 | |
| 7 | O | O | | | | | 1,15 | 1,15 | |
| 8 | O | | | | O | | 1,00 | 1,13 | |
| 9 | | O | | | O | | 0,88 | 1,12 | |
| 10 | | | O | | O | | 0,79 | | |
| R | | O | | | | O | -15,00 | | |

Status Ratios $i_{0\,VS1} = -2,00$     $i_{0\,VS2} = -3,00$
$i_{0\,NS1} = -4,00$     $i_{0\,NS2} = -2,00$

| Speed | Closed Shifting Elements | | | | | | Transmission | Level | Spread |
|---|---|---|---|---|---|---|---|---|---|
| | A | B | C | D | E | A' | | | |
| 1 | | | O | O | | | 5,10 | 1,70 | |
| 2 | O | | | O | | | 3,00 | 1,41 | |
| 3 | O | | O | | | | 2,13 | 1,42 | |
| 4 | O | O | | | | | 1,50 | 1,50 | 7,8 |
| 5 | O | | | | | O | 1,00 | 1,33 | |
| 6 | | O | | | | O | 0,75 | 1,15 | |
| 7 | | | O | | | O | 0,66 | | |
| R | | | | O | O | | -5,10 | | |

Status Ratios $i_{0\,VS}$ = −1,70

$i_{0\,NS1}$ = −2,00

$i_{0\,NS2}$ = −3,00

| Speed | Closed Shifting Elements | | | | | | Transmission | Level | Spread |
|---|---|---|---|---|---|---|---|---|---|
| | A | B | C | D | E | A' | | | |
| 1 | | | O | O | | | 5,10 | 1,70 | |
| 2 | O | | | O | | | 3,00 | 1,41 | |
| 3 | O | | O | | | | 2,13 | 1,42 | |
| 4 | O | O | | | | | 1,50 | 1,50 | 7,8 |
| 5 | O | | | | O | | 1,00 | 1,33 | |
| 6 | | O | | | O | | 0,75 | 1,15 | |
| 7 | | | O | | O | | 0,66 | | |
| R | | | | O | | O | -5,10 | | |

Status Ratios $i_{0\,VS} = -1,70$
$i_{0\,NS1} = -2,00$
$i_{0\,NS2} = -3,00$

| Speed | Closed Shifting Elements | | | | | | Transmission | Level | Spread |
|---|---|---|---|---|---|---|---|---|---|
| | A | B | C | D | E | A' | | | |
| 1 | | | O | O | | | 4,79 | 1,74 | |
| 2 | O | | | O | | | 2,75 | 1,41 | |
| 3 | O | | O | | | | 1,95 | 1,40 | |
| 4 | O | O | | | | | 1,40 | 1,40 | 7,2 |
| 5 | O | | | | O | | 1,00 | 1,29 | |
| 6 | | O | | | O | | 0,77 | 1,16 | |
| 7 | | | O | | O | | 0,67 | | |
| R | | | O | | | O | -3,51 | | |

Status Ratios $i_{0\,VS} = +2,41$
$i_{0\,NS1} = -1,75$
$i_{0\,NS2} = -3,40$

| Speed | Closed Shifting Elements | | | | | | Transmission | Level | Spread |
|---|---|---|---|---|---|---|---|---|---|
| | A | B | C | D | E | A' | | | |
| 1 | | | O | O | | | 4,79 | 1,74 | |
| 2 | O | | | O | | | 2,75 | 1,41 | |
| 3 | O | | O | | | | 1,95 | 1,40 | |
| 4 | O | O | | | | | 1,40 | 1,40 | 7,2 |
| 5 | O | | | | O | | 1,00 | 1,29 | |
| 6 | | O | | | O | | 0,77 | 1,16 | |
| 7 | | | O | | O | | 0,67 | | |
| R | | | O | | | O | -3,51 | | |

Status Ratios $i_{0\,VS}$ = + 2,41
$i_{0\,NS1}$ = - 1,75
$i_{0\,NS2}$ = - 3,40

| Speed | Closed Shifting Elements | | | | | | Transmission | Level | Spread |
|---|---|---|---|---|---|---|---|---|---|
| | A | B | D | E | D' | A' | | | |
| 1 | | O | | | | O | 7,43 | 1,73 | |
| 2 | | | O | | | O | 4,29 | 1,50 | |
| 3 | | O | O | | | | 2,86 | 1,62 | |
| 4 | O | | O | | | | 1,76 | 1,32 | 9,6 |
| 5 | O | O | | | | | 1,33 | 1,33 | |
| 6 | O | | | | O | | 1,00 | 1,30 | |
| 7 | | O | | O | | | 0,77 | | |
| R | | O | | | O | | -6,29 | | |

Status Ratios $i_{0\,VS} = -1,86$
$i_{0\,NS1} = -2,00$
$i_{0\,NS2} = -2,20$

| Speed | Closed Shifting Elements ||||||  Transmission | Level | Spread |
|---|---|---|---|---|---|---|---|---|---|
|   | A | B | D | E | D' | A' |   |   |   |
| 1 |   |   |   | O |   | O | 6,28 | 1,61 |   |
| 2 |   |   | O |   |   | O | 3,91 | 1,48 |   |
| 3 |   | O | O |   |   |   | 2,65 | 1,53 |   |
| 4 | O |   | O |   |   |   | 1,73 | 1,28 | 8,4 |
| 5 | O | O |   |   |   |   | 1,36 | 1,36 |   |
| 6 | O |   |   |   | O |   | 1,00 | 1,33 |   |
| 7 |   | O |   |   | O |   | 0,75 |   |   |
| R |   | O |   |   |   | O | -4,98 |   |   |

Status Ratios $i_{0\,VS} = -1,65$ $i_{0\,NS1} = -2,10$ $i_{0\,NS2} = -1,65$

| Speed | Closed Shifting Elements | | | | | | Transmission | Level | Spread |
|---|---|---|---|---|---|---|---|---|---|
| | A | B | C | D | E | D' | A' | | | |
| 1 | | | | | | | O | 10,00 | 3,00 | |
| 2 | | | | | | O | O | 3,33 | 1,67 | |
| 3 | | O | | | | | O | 2,00 | 1,20 | |
| 4 | | | O | O | | | | 1,67 | 1,17 | |
| 5 | O | | | O | | | | 1,43 | 1,14 | 12,0 |
| 6 | O | O | | | | | | 1,25 | 1,13 | |
| 7 | O | | O | | | | | 1,11 | 1,11 | |
| 8 | O | | | | | O | | 1,00 | 1,10 | |
| 9 | | O | | | | O | | 0,91 | 1,09 | |
| 10 | | | O | | | O | | 0,83 | | |
| R | | | O | | | | O | -10,00 | | |

Status Ratios $i_{0\,VS} = +2,00$ $i_{0\,NS1} = +2,50$ $i_{0\,NS2} = -2,00$

| Speed | Closed Shifting Elements | | | | | | Transmission | Level | Spread |
|---|---|---|---|---|---|---|---|---|---|
| | A | B | C | D | E | D' | A' | | |
| 1 | | | | | | | O | 7,26 | 1,91 | |
| 2 | | | O | | | | O | 3,80 | 1,43 | |
| 3 | | | O | O | | | | 2,65 | 1,33 | |
| 4 | | | | O | O | | | 1,99 | 1,13 | |
| 5 | O | | | O | | | | 1,77 | 1,12 | 9,7 |
| 6 | O | | O | | | | | 1,58 | 1,22 | |
| 7 | O | O | | | | | | 1,29 | 1,29 | |
| 8 | O | | | | | O | | 1,00 | 1,21 | |
| 9 | | O | | | | O | | 0,83 | 1,10 | |
| 10 | | | O | | | O | | 0,75 | | |
| R | | | O | | O | | | -7,95 | | |

Status Ratios $i_{0\,VS} = -1,65$ $i_{0\,NS1} = -2,30$ $i_{0\,NS2} = -3,00$

Status Ratios $i_{0\,vs} = +2{,}65$

| Speed | Closed Shifting Elements | | | | | | | Transmission | Level | Spread |
|---|---|---|---|---|---|---|---|---|---|---|
| | A | B | C | D | E | D' | A' | | | |
| 1 |   | O |   |   |   |   | O | 7,26 | 1,91 | |
| 2 |   |   | O |   |   |   | O | 3,80 | 1,43 | |
| 3 |   | O |   | O |   |   |   | 2,65 | 1,33 | |
| 4 |   |   | O | O |   |   |   | 1,99 | 1,13 | |
| 5 | O |   |   | O |   |   |   | 1,77 | 1,12 | 9,7 |
| 6 | O |   | O |   |   |   |   | 1,58 | 1,22 | |
| 7 | O | O |   |   |   |   |   | 1,29 | 1,29 | |
| 8 | O |   |   |   |   | O |   | 1,00 | 1,21 | |
| 9 |   | O |   |   |   | O |   | 0,83 | 1,10 | |
| 10 |   |   | O |   |   | O |   | 0,75 | | |
| R |   |   |   |   | O |   | O | -7,95 | | |

Status Ratios $i_{0\,VS} = +2,65$ $i_{0\,NS1} = -1,74$ $i_{0\,NS2} = -3,00$

| Speed | Closed Shifting Elements | | | | | | | Transmission | Level | Spread |
|---|---|---|---|---|---|---|---|---|---|---|
| | A | B | C | D | E | D' | A' | | | |
| 1 | | | | | | O | O | 10,00 | 2,00 | |
| 2 | | O | | | | | O | 5,00 | 1,50 | |
| 3 | | | O | | | | O | 3,33 | 1,33 | |
| 4 | | | | O | | | O | 2,50 | 1,25 | |
| 5 | | O | | O | | | | 2,00 | 1,20 | |
| 6 | | | O | O | | | | 1,67 | 1,17 | 12,0 |
| 7 | O | | | O | | | | 1,43 | 1,14 | |
| 8 | O | | O | | | | | 1,25 | 1,13 | |
| 9 | O | O | | | | | | 1,11 | 1,11 | |
| 10 | O | | | | O | | | 1,00 | 1,10 | |
| 11 | | O | | | O | | | 0,91 | 1,09 | |
| 12 | | | O | | O | | | 0,83 | | |
| R | | O | | | O | | | -10,00 | | |

Status Ratios $i_{0\,VS1} = -3,00$  $\qquad i_{0\,NS1} = +2,50$ $i_{0\,VS2} = +3,00$  $\qquad i_{0\,NS2} = -2,00$

MULTISTEP GEAR

This application is a national stage completion of PCT/EP02/03434 filed Mar. 27, 2002 which claims priority from German Application Serial No. 101 15 983.3 filed Mar. 30, 2001.

FIELD OF THE INVENTION

The present invention concerns a multiple-ratio transmission.

BACKGROUND OF THE INVENTION

The Applicant's earlier German Patent Application P 199 49 507.4 describes several transmission layouts for an automatic multiple-ratio transmission having various combinations of coupled planetary gear sets. By appropriate linkage of a non-shiftable front-mounted gear set combination to a shiftable rear-mounted gear set combination, at least seven forward speeds can be engaged in each case without group shifting. The number of shiftable forward speeds is at least two greater than the number of shifting elements. DE-P 199 49 507.4 proposes to embody the shiftable rear-mounted gear set as a two-carrier four-shaft transmission, exactly one shifting element being arranged on its first shaft, at least two on the second shaft, and exactly two on the third shaft. The fourth shaft of the two-carrier four-shaft transmission is connected to the output drive shaft of the transmission. In all variant embodiments of DE-P 199 49 507.4, it is also essential that a maximum of two shifting elements have the same rotation speed level.

A "two-carrier four-shaft transmission" is understood here to be an arrangement of two individual mechanically coupled single-carrier planetary gear sets in which as a result of a double component linkage, the coupled units have four so-called "free shafts," in which context a "shaft" can be a sun gear, a ring gear, or also a carrier of a planetary gear set.

It is the object of the present invention, proceeding from the aforesaid existing art, to develop further a multiple-ratio transmission, having at least seven forward speeds shiftable without group shifting, in terms of comparatively reduced design complexity with no change in its favorable ratio spacing and wide spread.

SUMMARY OF THE INVENTION

Proceeding from the existing art of DE-P 199 49 507.4, the multiple-ratio transmission comprises a front-mounted gear set connected to the input drive shaft of the transmission, and a rear-mounted gear set connected to the output drive shaft of the transmission. The front-mounted gear set comprises either one nonshiftable front-mounted planetary gear set, one shiftable front-mounted planetary gear set, or two coupled non-shiftable front-mounted planetary gear sets. The rear-mounted gear set is embodied as a two-carrier four-shaft transmission having two shiftable coupled rear-mounted planetary gear sets. The rear-mounted gear set thus encompasses two carriers and four central gears, a "central gear" being understood as either a sun gear or a ring gear of a planetary gear set. A "free shaft" of the two-carrier four-shaft transmission can be a sun gear, a ring gear, or also a carrier of a planetary gear set.

The front-mounted gear set is selectively connectable to the shiftable rear-mounted planetary gear sets by selectable shifting of a maximum of seven shifting elements. The shiftable rear-mounted gear set is always connectable via one shifting element to the input drive shaft of the transmission. In each engaged gear, two shifting elements are engaged. Upon shifting from one gear to the next, only one shifting element is shifted out and one further shifting element shifted in, thereby eliminating group shifts—in which multiple shifting elements must be simultaneously shifted in or out—which are critical in terms of shifting quality.

In a first approach to achieving the object of the invention, the multiple-ratio transmission according to the present invention comprises six shifting elements, one front-mounted planetary gear set, and two coupled shiftable planetary gear sets constituting two-carrier four-shaft transmissions, and has seven forward speeds and one reverse gear. According to the present invention, it is proposed to connect the first free shaft of the rear-mounted gear set to one shifting element, the second free shaft of the rear-mounted gear set to two shifting elements, and the third free shaft of the rear-mounted gear set to three shifting elements. The fourth free shaft of the rear-mounted gear set is connected directly to the output drive shaft of the transmission. As compared with the comparable transmission according to the aforementioned existing art, therefore, one additional shifting element is connected to the third free shaft of the rear-mounted gear set embodied as a two-carrier four-shaft transmission.

The front-mounted planetary gear set is preferably embodied here in non-shiftable fashion.

The first free shaft of the rear-mounted gear set is connected here to the first shifting element and, when the first shifting element is engaged, rotates at a rotation speed less than or equal to the input rotation speed of the input drive shaft. The second free shaft of the rear-mounted gear set is connected to the second and third shifting elements. The third free shaft of the rear-mounted gear set is connected to the fourth and fifth shifting elements. When the fourth shifting element is engaged, the third free shaft is preferably locked; but depending on the embodiment, it can also rotate at a rotation speed less than the input drive rotation speed of the input shaft. When the fifth shifting element is engaged, the third free shaft rotates at the input rotation speed of the input drive shaft, and thus generates the direct gear and the overdrive ratios. No shifting element is arranged on the fourth free shaft of the rear-mounted gear set. According to the present invention, the third free shaft of the rear-mounted gear set is connected to the sixth shifting element. When the sixth shifting element is engaged, the third free shaft always rotates at a rotation speed less than the input rotation speed of the input drive shaft.

In a second approach to achieving the object of the invention, the multiple-ratio transmission according to the present invention comprises six shifting elements, a maximum of two coupled front-mounted planetary gear sets, and two coupled shiftable rear-mounted planetary gear sets constituting two-carrier four-shaft transmissions, and likewise has seven forward speeds and one reverse gear. According to the present invention, it is proposed that the first, second, and third free shaft of the rear-mounted gear set each be connected to two shifting elements. The fourth free shaft of the rear-mounted gear set is connected directly to the output drive shaft of the transmission. As compared with the aforementioned existing art, therefore, one additional shifting element is connected to the first free shaft of the rear-mounted gear set.

The front-mounted gear set can here comprise one non-shiftable front-mounted planetary gear set, or two coupled non-shiftable front-mounted planetary gear sets, or one shiftable front-mounted planetary gear set.

In contrast to the first approach to achieving the object of the present invention, the sixth shifting element is now connected to the first free shaft of the rear-mounted gear set rather than to the third free shaft. When the sixth shifting element is engaged, the first free shaft of the rear-mounted gear set thus always rotates at a rotation speed less than the input rotation speed of the input drive shaft. As in the case of the first approach to achieving the object of the present invention, the first shifting element is connected to the first free shaft of the rear-mounted gear set, the second and third shifting elements to the second free shaft of the rear-mounted gear set, and the fourth and fifth shifting elements to the third free shaft of the rear-mounted gear set. When the first shifting element is engaged, i.e., closed, the first free shaft of the rear-mounted gear set rotates at the input rotation speed of the input drive shaft. When the second shifting element is engaged, the second free shaft of the rear-mounted gear set rotates at a rotation speed greater than or equal to zero, and less than the input rotation speed of the input drive shaft. When the third shifting element is engaged, the second free shaft of the rear-mounted gear set rotates at a rotation speed less than or equal to zero. When the fourth shifting element is engaged, the third free shaft of the rear-mounted gear set rotates at a rotation speed that is greater than or equal to zero, and always less than the input rotation speed of the input drive shaft. When the fifth shifting element is engaged, the third free shaft rotates at the input rotation speed of the input drive shaft, thus generating the direct gear and the overdrive ratios.

In a third approach to achieving the object, the multiple-ratio transmission according to the present invention once again comprises six shifting elements, one front-mounted planetary gear set, and two coupled shiftable rear-mounted planetary gear sets constituting two-carrier four-shaft transmissions, and has seven forward speeds and one reverse gear. It is proposed according to the present invention that the first free shaft of the rear-mounted gear set be connected to two shifting elements, the second free shaft of the rear-mounted gear set to only one shifting element, and the third free shaft of the rear-mounted gear set to three shifting elements. The fourth free shaft is connected directly to the output drive shaft of the transmission.

The front-mounted planetary gear set is here preferably embodied in non-shiftable fashion.

As compared with the aforementioned existing art and the first and second approaches to achieving the object of the present invention, the third shifting element connected to the second free shaft is thus omitted in favor of an additional seventh shifting element which, according to the present invention, is connected as an additional shifting element to the first free shaft of the rear-mounted gear set. As in the case of the first and second approaches to achieving the object of the present invention, as compared with the aforementioned existing art an additional sixth shifting element is provided which, according to the present invention, is connected to the third free shaft of the rear-mounted gear set.

Both additional shifting elements are embodied as brakes, so that when they are in the engaged state the third and the first free shaft of the rear-mounted gear set are stationary. The first shifting element is connected to the first free shaft of the rear-mounted gear set and, in the engaged state, rotates at the input rotation speed of the input drive shaft. The second shifting element is connected to the second free shaft of the rear-mounted gear set in such a way that when the second shifting element is engaged, the second free shaft rotates at a rotation speed that is between zero and the input rotation speed of the input drive shaft. The fourth shifting element connected to the third free shaft of the rear-mounted gear set generates, when engaged, a rotation speed that is also between zero and the input rotation speed of the input drive shaft. The fifth shifting element, likewise connected to the third free shaft of the rear-mounted gear set, generates the direct gear and the overdrive ratios when engaged; the third free shaft then rotates at the input rotation speed of the input drive shaft.

In a fourth approach to achieving the object of the present invention, the multiple-ratio transmission now has seven shifting elements, one front-mounted planetary gear set or two coupled front-mounted planetary gear sets, and two coupled shiftable rear-mounted planetary gear sets constituting two-carrier four-shaft transmissions. A total of at least ten forward speeds and one reverse gear can be engaged. It is proposed according to the present invention that the first and the second free shaft of the rear-mounted gear set each be connected to two shifting elements, and that the third free shaft of the rear-mounted gear set be connected to three shifting elements.

The single front-mounted planetary gear set, or both coupled front-mounted planetary gear sets, are preferably embodied in non-shiftable fashion.

As in the third approach to achieving the object of the present invention, the third and the first free shaft of the rear-mounted gear set are therefore each connected to a shifting element that is additional as compared with the aforementioned existing art. The shifting element that is additional as compared with the third approach to achieving the object of the present invention allows at least three further forward speeds to be engaged.

In an embodiment of the fourth approach to achieving the object of the present invention having only one non-shiftable front-mounted planetary gear set, the multiple-ratio transmission according to the present invention comprises a total of ten forward speeds and one reverse gear. In another embodiment of the fourth approach to achieving the object of the present invention, it is proposed to constitute the front-mounted gear set from two coupled non-shiftable front-mounted planetary gear sets, so that in combination with seven shifting elements, a total of twelve forward speeds and one reverse gear is implemented.

In the multiple-ratio transmission according to the fourth approach to achieving the object of the present invention, the first shifting element is always connected to the first free shaft of the rear-mounted gear set and is connectable to the input drive shaft, so that when the first shifting element is engaged, the first free shaft rotates at the input rotation speed of the input drive shaft. The second shifting element is connected to the second free shaft of the rear-mounted gear set, which then, when the second shifting element is engaged, rotates at a rotation speed between zero and the input rotation speed of the input drive shaft. The third shifting element is embodied as a brake and is connected to the second free shaft of the rear-mounted gear set, so that the latter shaft is stationary when the third shifting element is engaged. The fourth shifting element is connected to the third free shaft of the rear-mounted gear set. When the fourth shifting element is engaged, the third free shaft always rotates at a rotation speed that is less than the input rotation speed of the input drive shaft and greater than zero. The fifth shifting element is likewise connected to the third free shaft of the rear-mounted gear set and, in the engaged state, rotates at the input rotation speed of the drive shaft, thus generating the direct gear and the overdrive ratios. As in the first and third approaches to achieving the object of the present invention, the third free shaft of the rear-mounted gear set is connected to a sixth shifting element that is additional as compared with the aforementioned existing art. According to the present invention, the sixth shifting element is embodied as a brake, so that when it is in the engaged state, the third free shaft of the rear-mounted gear set is stationary. The seventh shifting element that is additional as compared with the aforementioned existing art is, according to the present invention (as in the third approach to achieving the object of the present invention), connected to the first free shaft of the rear-mounted gear set. When the seventh shifting element is engaged, the first free shaft thus always rotates at a rotation speed less than the input rotation speed of the input drive shaft.

In advantageous embodiments of all four approaches to achieving the object of the present invention, the first and the second free shaft of the two-carrier four-shaft transmission are each embodied as the central gear of the rear-mounted gear set, in particular each as the sun gear, and the third free shaft as the carrier. Other mechanical couplings of the components within the rear-mounted gear set embodied as a two-carrier four-shaft transmission can of course also be provided in other embodiments of the multiple-ratio transmission according to the present invention.

The largest possible number of gears can be engaged using the smallest possible number of shifting elements and planetary gear sets, and in which the multiple-ratio transmission can be manufactured in correspondingly economical fashion.

BRIEF DESCRIPTION OF THE DRAWINGS

The invention will now be described, by way of example, with reference to the accompanying drawings in which.

DETAILED DESCRIPTION OF THE INVENTION

Figures 1A, 1B:
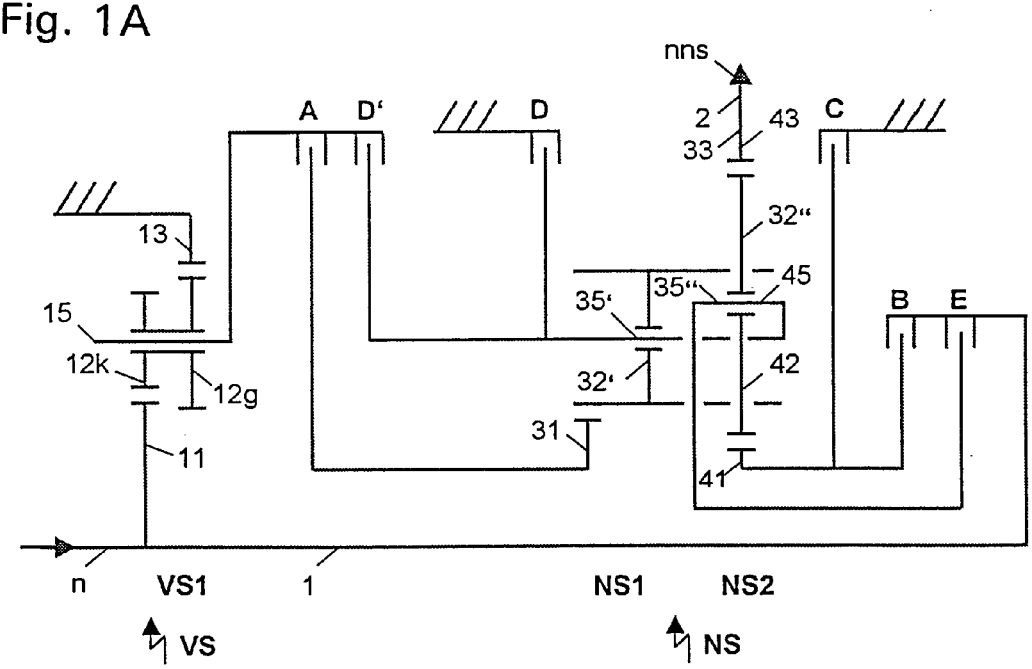
FIGS. 1A and 1B show a first embodiment of a multiple-ratio transmission according to the present invention having seven forward speeds and one reverse gear (according to the first approach to achieving the object)

The Figures depict, in accordance with the respective embodiment of the multiple-ratio transmission, the power flow diagram (figure indices A and C), as well as the shifting logic with pertinent exemplary conversion ratios for the individual gears, ratio spacing, transmission ratio spread, and static ratios for the individual planetary gear sets (figure indices B and D).

In order to create, especially for passenger cars, buses, and trucks, a multiple-ratio transmission that can be manufactured economically as compared with DE-P 199 49 507.4, having as few planetary gear sets as possible but nonetheless at least seven forward speeds shiftable without group shifting, the individual shifting elements of the transmission are connected to the individual free shafts of the shiftable rear-mounted gear set in accordance with the fifteen embodiments of the present invention described in detail below. As a result of these respective linkages according to the present invention of the shifting elements to the shiftable rear-mounted gear set, the rotation speeds generated in the non-shiftable or shiftable front-mounted gear set are transferable, along with the input rotation speed of the input drive shaft, to the rear-mounted gear set as a function of the shifting elements that are actuated.

In all the Figures, 1 designates an input drive shaft of the transmission, and 2 an output drive shaft of the transmission. The transmission has in each case a front-mounted gear set VS and a shiftable rear-mounted gear set NS. Input drive shaft 1 rotates at an input rotation speed n, and output drive shaft 2 at an output rotation speed nns of rear-mounted gear set NS. NS1 and NS2 designate a first and a second shiftable rear-mounted planetary gear set, VS1 designates a non-shiftable or shiftable first front-mounted planetary gear set, and VS2 a non-shiftable second front-mounted planetary gear set that is present depending on the embodiment. First front-mounted planetary gear set VS1 encompasses a sun gear 11, a carrier 15 having planet gears 12, and a ring gear 13. Using analogous nomenclature for second front-mounted planetary gear set VS2, first rear-mounted planetary gear set NS1, and second rear-mounted planetary gear set NS2, the sun gears are labeled respectively 21, 31, and 41, the carriers respectively 25, 35, and 45, with planetary gears 22, 32, and 42, and the ring gears respectively 23, 33, and 43. Depending on the embodiment, as many as seven shifting elements (clutches or brakes) A, B, C, D, E and D', A', that act on the gear sets, are present.

In all the embodiments of the multiple-ratio transmission according to the present invention depicted below by way of example, first shifting element A is connected to a first central gear of first rear-mounted planetary gear set NS1 and, in the engaged (i.e., closed) state, rotates at a rotation speed less than or equal to input rotation speed n of input drive shaft 1. Second and third shifting elements B and C are connected to a first central gear of second rear-mounted planetary gear set NS2 (constituting a second free shaft of rear-mounted gear set NS). Regarding the rotation speeds at the engaged shifting elements B, C, the following apply: 1. when shifting elements A and D are engaged, the rotation speed at the shaft which connects shifting elements B and C to the central gear of gear set NS2 is less than or equal to the rotation speeds generated when shifting element B or C is actuated; 2. when shifting elements A and E are actuated, the rotation speed at the shaft which connects shifting elements B and C to the central gear of gear set NS2 is greater than or equal to the rotation speeds generated when shifting element B or C is actuated.

A first embodiment of a multiple-ratio transmission according to the present invention, exemplifying the first approach to achieving the object of the present invention, will now be explained with reference to FIGS. 1A and 1B. Here the multiple-ratio transmission comprises six shifting elements A, B, C, D, E, and D', one non-shiftable front-mounted planetary gear set VS1, and two coupled shiftable rear-mounted planetary gear sets NS1 and NS2, and has seven forward speeds and one reverse gear. According to the present invention, the first free shaft of rear-mounted gear set NS is connected to one shifting element A, the second free shaft of rear-mounted gear set NS to two shifting elements B, C, and the third free shaft of rear-mounted gear set NS to three shifting elements D, E, D'. As compared with the comparable transmission according to the aforementioned existing art, therefore, one additional shifting element is connected to the third free shaft of rear-mounted gear set NS.

In the first exemplifying embodiment of the multiple-ratio transmission according to the present invention, the first free shaft of rear-mounted gear set NS, embodied as a two-carrier four-shaft transmission, is constituted by a first central gear of rear-mounted gear set NS, concretely by sun gear 31 of first rear-mounted planetary gear set NS1. The second free shaft of rear-mounted gear set NS is constituted by a second central gear of rear-mounted gear set NS, concretely by sun gear 41 of second rear-mounted planetary gear set NS2. The third free shaft of rear-mounted gear set NS is constituted by a carrier of the rear-mounted gear set, concretely by interconnected carriers 45, 35', 35" of planet gears 42 of second rear-mounted planetary gear set NS2 and inner and outer planet gears 32', 32" of first rear-mounted planetary gear set NS1. The fourth free shaft of the rear-mounted gear set is constituted by a third central gear of rear-mounted gear set NS, specifically by the common ring gear 33, 43 of first and second rear-mounted planetary gear sets NS1 and NS2.

At this point, and before entering the following descriptions, it must be noted that certain of the following descriptions refer to "minus transmissions" or "minus planetary transmissions", which are also commonly referred to in the relevant arts as planetary-minus-gearsets", and to "plus transmissions" or "plus planetary transmissions", which are also commonly referred to as "plus-planetary-gearsets". Although these terms are well known and commonly used terms of art in the relevant arts, a brief description of these terms will assist in understanding the full meaning of the following descriptions. In brief a planetary gearset or transmission is a planetary-minus-gearset or a planetary-plus-gearset when the planetary carrier is fixed and the sun pear is driven by an input speed in a defined direction of rotation. If the ring gear rotates, as a result of the sun gear rotation, in the same direction as the sun gear, then the planetary gearset is referred to as a planetary-plus-gearset, or a plus-transmission. If the ring gear rotates, as a result of the sun gear rotation, in the direction opposite to the rotation of the sun gear, then the planetary gearset is referred to as a planetary-minus-gearset, or a minus-transmission. In a typical implementation of a minus-transmission or a plus-transmission, and for example, the transmission, or planetary gearset, is a double pinion type planetary gear set having a sun gear, a ring gear and two sets of planetary pinions wherein the first set of planetary pinions intermesh with the sun gear and the second set of planetary pinions while the second set of planetary pinions intermesh with the first set of planetary pinions and the ring gear. The terms therefore effectively describe a single pinion type planetary gearset having a sun gear, a ring gear and only one set of planetary pinions. It is well known, however, that there are several other types of planetary gearsets that can be referred to as a "planetary-plus-gearset" or a "planetary-minus-gearset. For example, a planetary gearset having a single sun gear, a single ring gear and an odd number of planetary pinion sets may be referred to as a "minus-transmission", while a similar gearset having, however, an even number of planetary pinion sets, may be referred to as a "plus-transmission".

As depicted in FIG. 1A, front-mounted gear set VS is embodied as a minus planetary transmission having staged planets. Input drive shaft 1 (rotation speed n) is connected to sun gear 11 of first front-mounted planetary gear set VS1 and is connectable via fifth shifting element E, embodied as a clutch, to carrier 45 of planet gears 42 of second rear-mounted planetary gear set NS2, and via second shifting element B, embodied as a clutch, to sun gear 41 of second rear-mounted planetary gear set NS2. Ring gear 13 of first front-mounted planetary gear set VS1 is locked. Planet gears 12 of first front-mounted planetary gear set VS1 are embodied as staged planet gears having small planet gears 12k and large planet gears 12g, small planet gears 12k meshing with sun gear 11, and large planet gears 12g with ring gear 13 of first front-mounted planetary gear set VS1. The common carrier 15 of small and large planet gears 12k and 12g of first front-mounted planetary gear set VS1 is connectable via first shifting element A, embodied as a clutch, to sun gear 31 of first rear-mounted planetary gear set NS1 and, according to the present invention, via sixth shifting element D', embodied as a clutch, to a carrier 35' of inner planet gears 32' of first rear-mounted planetary gear set NS1. The first rear-mounted planetary gear set therefore has a double-planet configuration. Carrier 35' of inner planet gears 32' of first rear-mounted planetary gear set NS1 is also lockable via fourth shifting element D embodied as a brake. Sun gear 41 of second rear-mounted planetary gear set NS2 is lockable via third shifting element C embodied as a brake. Carrier 35' of inner planet gears 32' of first rear-mounted planetary gear set NS1 is coupled to a carrier 35" of outer planet gears 32' of first rear-mounted planetary gear set NS1, and to carrier 45 of planet gears 42 of second rear-mounted planetary gear set NS2. Outer planet gears 32' of first rear-mounted planetary gear set NS1, and planet gears 42 of second rear-mounted planetary gear set NS2, are also coupled. Ring gear 33 of first rear-mounted planetary gear set NS1, and ring gear 43 of second rear-mounted planetary gear set NS2, are combined and are connected to output drive shaft 2 (rotation speed nns).

What is essential to the invention in the first embodiment shown in FIG. 1A is that the third free shaft of rear-mounted gear set NS, embodied as a two-carrier four-shaft transmission, to which clutch E and brake D are connected, comprises a shifting element D' which is additional as compared with the aforementioned existing art, and whose rotation speed in the engaged state is greater than zero and less than the input rotation speed n of input drive shaft 1.

By selective shifting of the six shifting elements A, B, C, D, E, D', a total of seven forward speeds and one reverse gear can be selected in accordance with the shifting logic depicted in FIG. 1 B, without group shifting, with favorably spaced ratios and a good spread.

Figures 2A, 2B:
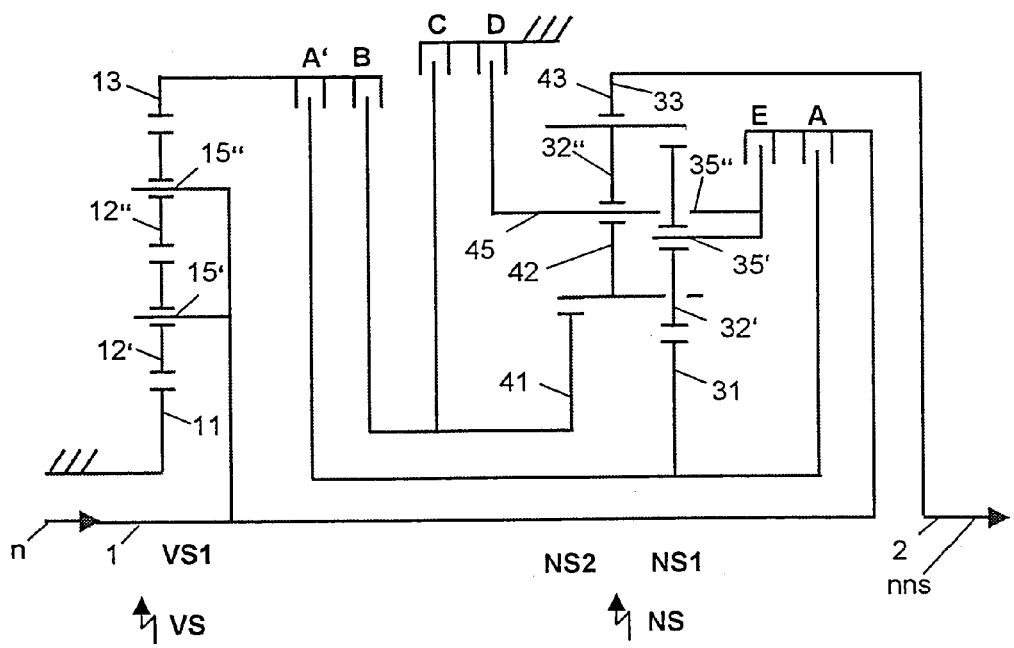
FIGS. 2A and 2B show a second embodiment of a multiple-ratio transmission according to the present invention having seven forward speeds and one reverse gear (according to the second approach to achieving the object)

FIG. 2A shows a second embodiment of a multiple-ratio transmission according to the present invention, exemplifying the second approach to achieving the object of the present invention. In contrast to the first embodiment of the present invention, instead of sixth shifting element D' connected to the third free shaft of rear-mounted gear set NS, a seventh shifting element A' that is additional as compared with the aforementioned existing art is now attached to the first free shaft, to which first shifting element A is attached, of rear-mounted gear set NS embodied as a two-carrier four-shaft transmission.

Drive shaft 1 (rotation speed n) is here connected to a carrier 15' of inner planet gears 12' of first front-mounted planetary gear set VS1 and to a carrier 15" of outer planet gears 12" of first front-mounted planetary gear set VS1 and is connectable via first shifting element A, embodied as a clutch, to sun gear 31 of first rear-mounted planetary gear set NS1 and via fifth shifting element E, embodied as a clutch, via carrier 35" of outer planet gears 32" of first rear-mounted planetary gear set NS1, to a carrier 45 of planet gears 42 of second rear-mounted planetary gear set NS2. Carrier 45 of second rear-mounted planetary gear set NS2 is thus connected to both carriers 35" and 35' of first rear-mounted planetary gear set NS1. Outer planet gears 32" of first rear-mounted planetary gear set NS1, and planet gears 42 of second rear-mounted planetary gear set NS2, are combined. Ring gear 13 of the first, non-shiftable front-mounted planetary gear set VS1 is connectable via seventh shifting element A', embodied as a clutch, to sun gear 31 of first rear-mounted planetary gear set NS1, and via second shifting element B, embodied as a clutch, to sun gear 41 of second rear-mounted planetary gear set NS2. Sun gear 41 of second rear-mounted planetary gear set NS2 is lockable via third shifting element C embodied as a brake, and carrier 45 of second rear-mounted planetary gear set NS2 is lockable via fourth shifting element D embodied as a brake. Ring gear 33 of first rear-mounted planetary gear set NS1, and ring gear 43 of second rear-mounted planetary gear set NS2, are connected to output drive shaft 3 (rotation speed nns) of the transmission.

As shown by the shifting logic depicted in FIG. 2B, a total of seven forward speeds and one reverse gear can be selected, without group shifting, by selective shifting of the six shifting elements. The ratio spacing is very harmonious, and the spread is wide. In one configuration of the second embodiment of the multiple-ratio transmission according to the present invention, provision can be made for the third gear to be selected by actuation of shifting elements C and A, rather than by actuation of shifting elements B and A'.

A third embodiment of a multiple-ratio transmission according to the present invention, which in terms of the number of gear sets and shifting elements in the front- and rear-mounted gear sets is comparable to the second embodiment depicted in FIG. 2A, will now be explained by way of example with reference to FIGS. 3A and 3B. Here as well, the free shaft of rear-mounted gear set NS, embodied as a two-carrier four-shaft transmission, to which first clutch A is attached is connected to a sixth shifting element A' that is additional as compared with the aforementioned existing art.

Front-mounted gear set VS comprises only one first, non-shiftable front-mounted planetary gear set VS1, embodied as a double-planet gear set, having a sun gear 11, a ring gear 13, and two coupled carriers 15', 15" having inner and outer planet gears 12', 12". The two rear-mounted planetary gear sets NS1 and NS2 of rear-mounted gear set NS are each embodied as single planetary gear sets.

Figures 3A, 3B:
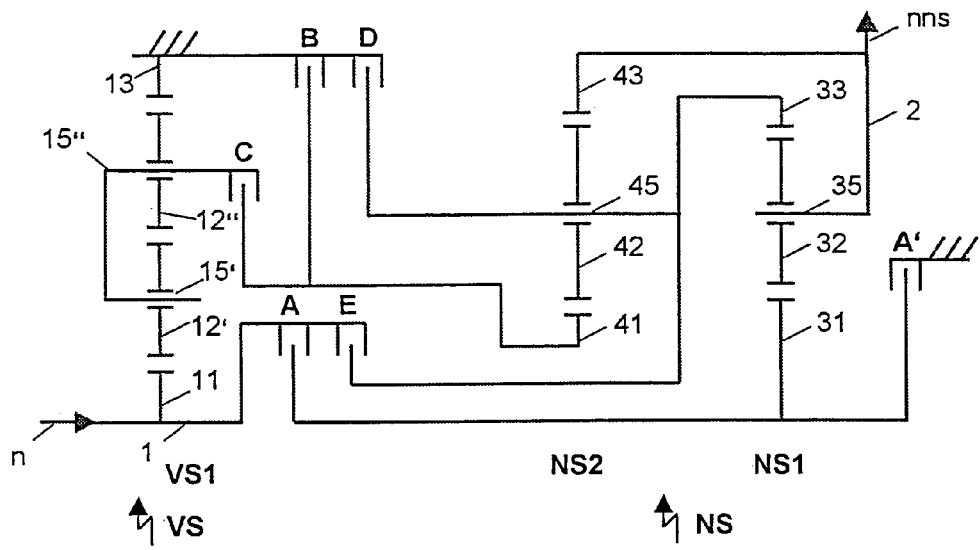
FIGS. 3A and 3B show a third embodiment of a multiple-ratio transmission according to the present invention having seven forward speeds and one reverse gear (according to the second approach to achieving the object)

As depicted in FIG. 3A, input drive shaft 1 (rotation speed n) is connected to sun gear 11 of front-mounted planetary gear set VS1, and is connectable via first shifting element A, embodied as a clutch, to sun gear 31 of first rear-mounted planetary gear set NS1 and via fifth shifting element E, embodied as a clutch, to carrier 45 of planet gears 42 of second rear-mounted planetary gear set NS2. Ring gear 13 of first front-mounted planetary gear set VS1 is locked. Sun gear 41 of second rear-mounted planetary gear set NS2 is connectable via third shifting element C, embodied as a clutch, to carrier 15" of outer planet gears 12" of first front-mounted planetary gear set VS1 and to carrier 15', coupled thereto, of inner planet gears 12'. Sun gear 41 of second rear-mounted planetary gear set NS2 is lockable via second shifting element B embodied as a brake. Carrier 45 of second rear-mounted planetary gear set NS2, and ring gear 33 of first rear-mounted planetary gear set NS1, are connected to one another and are lockable via fourth shifting element D embodied as a brake. Sun gear 31 of first rear-mounted planetary gear set NS1 is lockable via the additional sixth shifting element A'. Carrier 35 of planet gears 32 of first rear-mounted planetary gear set NS1, ring gear 43 of second rear-mounted planetary gear set NS2, and output drive shaft 3 (rotation speed nns) are connected to one another.

By selective shifting of the six shifting elements, a total of seven forward speeds and one reverse gear can be selected in accordance with the shifting logic depicted in FIG. 3B.

The advantage over the aforementioned existing art of this third embodiment of the multiple-ratio transmission according to the present invention is that instead of the fourth clutch, a third brake is used, with the correspondingly favorable outlay in terms of design and production engineering for pressure delivery.

Figures 3C, 3D:
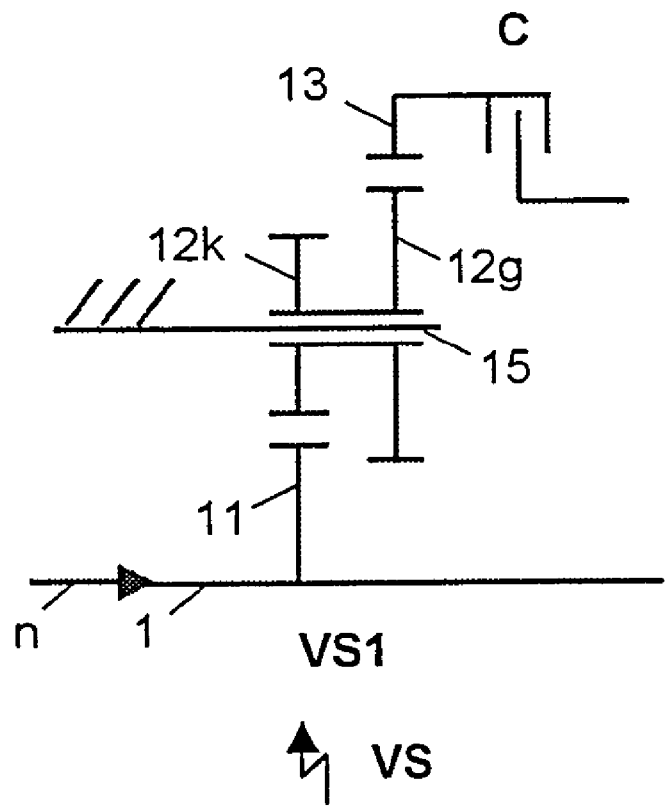
FIGS. 3C and 3D show a development of the third embodiment of a multiple-ratio transmission according to the present invention.

In a development of the third embodiment of the multiple-ratio transmission according to the present invention, it is proposed to embody front-mounted gear set VS as a minus transmission having a staged planet. This embodiment of front-mounted gear set VS is depicted in FIG. 3C. Here input drive shaft 1 (rotation speed n) is connected to sun gear 11 of the first, non-shiftable front-mounted planetary gear set VS1. Carrier 15, with coupled large and small planet gears 12g and 12k, of front-mounted planetary gear set VS1 is locked. Clutch C is attached to ring gear 13 of first front-mounted planetary gear set VS1. Sun gear 11 of first front-mounted planetary gear set VS1 meshes with small planet gears 12k of front-mounted planetary gear set VS1, while large planet gears 12g of front-mounted planetary gear set VS1 mesh with its ring gear 13. FIG. 3D shows the static ratio of first front-mounted planetary gear set VS1 of this development of the third embodiment of a multiple-ratio transmission according to the present invention. First front-mounted planetary gear set VS1 embodied in this fashion has a lower relative planet rotation speed and better efficiency as compared with the configuration shown in FIG. 3A.

In another development of the third embodiment of the multiple-ratio transmission according to the present invention, brake A' can also be replaced by a clutch D'. If this development is derived from the embodiment according to FIG. 3A, said clutch D' is then attached to the coupled carriers 15' and 15" of first front-mounted planetary gear set VS1, and to carrier 45 of second rear-mounted planetary gear set NS2. If this development is derived from the embodiment according to FIG. 3C, said clutch D' is then attached to ring gear 13 of first front-mounted planetary gear set VS1 and to carrier 45 of second rear-mounted planetary gear set NS2. The clutch and gear-set configuration of this development advantageously makes possible the fourth embodiment of a coaxial design of the multiple-ratio transmission.

Figures 4A, 4B:
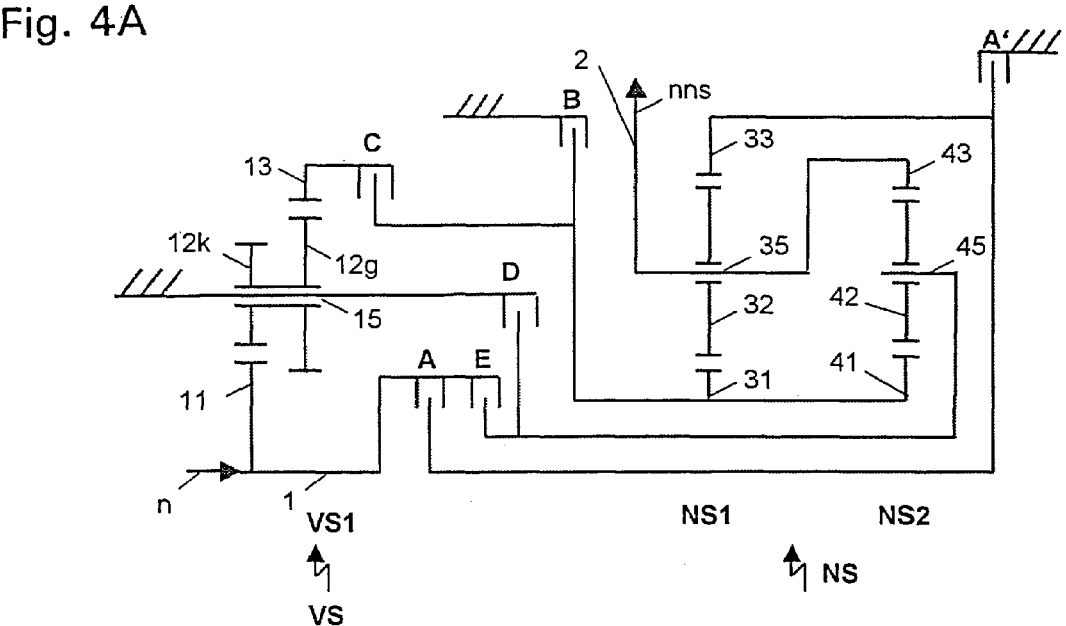
FIGS. 4A and 4B show a fourth embodiment of a multiple-ratio transmission according to the present invention having seven forward speeds and one reverse gear (according to the second approach to achieving the object)

As a further example of the second approach to achieving the object of the present invention, FIG. 4A shows a fourth embodiment of a multiple-ratio transmission according to the present invention. In this it is proposed to embody front-mounted gear set VS as a non-shiftable minus transmission having a staged planet. Sun gear 11 of first front-mounted planetary gear set VS1 meshes with small planet gears 12k of front-mounted planetary gear set VS1, while large planet gears 12g of front-mounted planetary gear set VS1 mesh with its ring gear 13. Input drive shaft 1 (rotation speed n) is connected to sun gear 11 of first front-mounted planetary gear set VS1, and is connectable via first shifting element A, embodied as a clutch, to ring gear 33 of first rear-mounted planetary gear set NS1 and via fifth shifting element E, embodied as a clutch, to carrier 45 of planet gears 42 of second rear-mounted planetary gear set NS2. Carrier 15 having the coupled large and small planet gears 12g, 12k of front-mounted planetary gear set VS1 is locked. Sun gear 31 of first rear-mounted planetary gear set NS1 and sun gear 41 of second rear-mounted planetary gear set NS2 are connected to one another, and are lockable via second shifting element B embodied as a brake. Ring gear 13 of first front-mounted planetary gear set VS1 is connectable via third shifting element C, embodied as a clutch, to sun gear 31 of first rear-mounted planetary gear set NS1 and to the coupled sun gear 41 of second rear-mounted planetary gear set NS2. Carrier 45 of second rear-mounted planetary gear set NS2 is lockable via shifting element D embodied as a brake, preferably via carrier 15 of first front-mounted planetary gear set VS1. Ring gear 33 of first rear-mounted planetary gear set NS1 is lockable via the additional sixth shifting element A'. Carrier 35 of planet gears 32 of first rear-mounted planetary gear set NS1, and ring gear 43 of second rear-mounted planetary gear set NS2, are connected to one another and to output drive shaft 3 (rotation speed nns).

By selective shifting of the six shifting elements, a total of seven forward speeds and one reverse gear can be selected in accordance with the shifting logic depicted in FIG. 4B.

The advantage of this fourth embodiment of a multiple-ratio transmission according to the present invention over the third embodiment is on the one hand that sun gears 31 and 41 in the rear-mounted gear set are arranged, in a manner favorable in terms of production engineering, on one shaft. On the other hand, first front-mounted planetary gear set VS1, embodied as a minus transmission, has a lower relative planet rotation speed and better efficiency as compared with the embodiment shown in FIG. 3A.

Figures 5A, 5B:
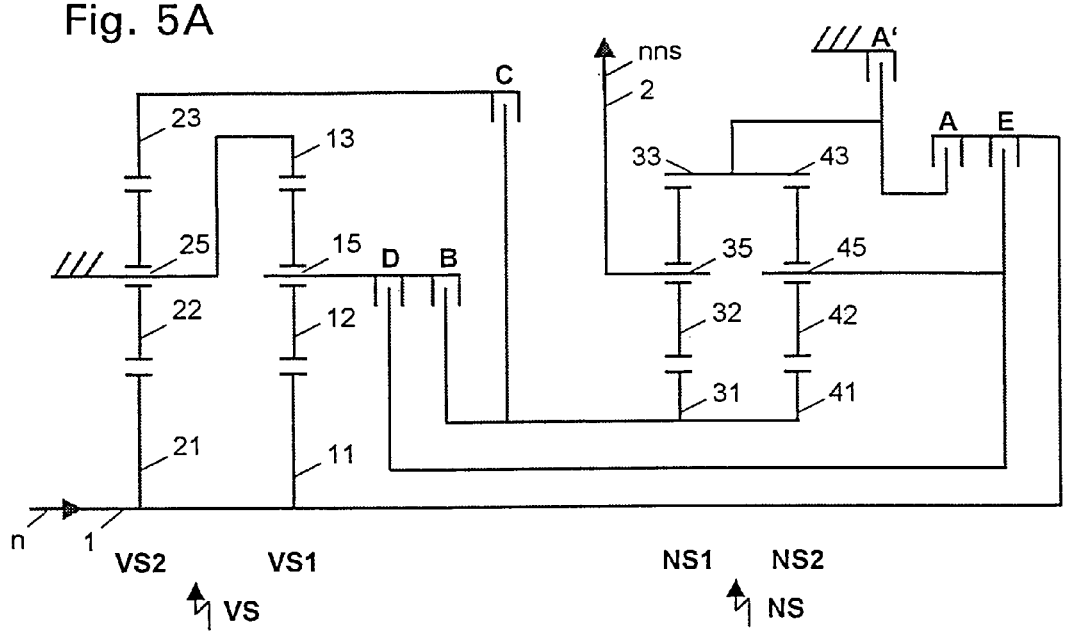
FIGS. 5A and 5B show a fifth embodiment of a multiple-ratio transmission according to the present invention having ten forward speeds and one reverse gear (according to the second approach to achieving the object)

Exemplifying the second approach to achieving the object of the present invention, FIG. 5A shows a fifth embodiment of a multiple-ratio transmission according to the present invention which, like the embodiments of FIGS. 2A, 3A, and 4A described above, has, on the free shaft of rear-mounted gear set NS to which first clutch A is attached, a sixth shifting element A' that is additional as compared with the existing art.

Front-mounted gear set VS now comprises two coupled non-shiftable front-mounted planetary gear sets VS1 and VS2. Input drive shaft 1 (rotation speed n) is here connected to sun gear 21 of second front-mounted planetary gear set VS2 and to sun gear 11 of first front-mounted planetary gear set VS1, and is connectable via fifth shifting element E, embodied as a clutch, to carrier 45 of planet gears 42 of second rear-mounted planetary gear set NS2, and via first shifting element A, embodied as a clutch, to ring gear 43 of second rear-mounted planetary gear set NS2. Carrier 25 of planet gears 22 of second front-mounted planetary gear set VS2, and ring gear 13 of first front-mounted planetary gear set VS1, are locked. Sun gear 31 of first rear-mounted planetary gear set NS1 and sun gear 41 of second rear-mounted planetary gear set NS2 are connected to one another, and are connectable via third shifting element C, embodied as a clutch, to ring gear 23 of second front-mounted planetary gear set VS2, and via second shifting element B, embodied as a clutch, to carrier 15 of planet gears 12 of first front-mounted planetary gear set VS1. Carrier 15 of first front-mounted planetary gear set VS1 is connectable via fourth shifting element D, embodied as a clutch, to carrier 45 of second rear-mounted planetary gear set NS2. Ring gear 43 of second rear-mounted planetary gear set NS2, and ring gear 33 of first rear-mounted planetary gear set NS1, are connected to one another, and are lockable via sixth shifting element A' embodied as a brake. Carrier 35 of planet gears 32 of first rear-mounted planetary gear set NS1 is connected to output drive shaft 3 (rotation speed nns).

By selective shifting of the six shifting elements, a total of ten forward speeds and one reverse gear can be selected in accordance with the shifting logic depicted in FIG. 5B.

This fifth embodiment of a multiple-ratio transmission according to the present invention is characterized by a large number of ratios and by a crawler gear characteristic in the first forward speed and the reverse gear. As a result of the above-described component-related coupling of the constituents of rear-mounted planetary gear sets NS1, NS2 and their connection in terms of power flow by clutches A, E and brake A', and an advantageous physical arrangement of these three shifting elements A, E, A' on the transmission side facing away from the input drive side—i.e., physically downstream (in the power flow direction) from all the planetary gear sets preferably arranged coaxially with input drive shaft 1—and the output drive approximately at the center of the transmission thereby made possible, the fourth embodiment according to the present invention of the multiple-ratio transmission is especially suitable for a front-transverse application, i.e., a drive system having a drive engine arranged transversely to the output drive.

FIGS. 6A, 6B through 9A, 9B explain four further embodiments of a multiple-ratio transmission according to the second invention which are derived from the third embodiment described above. What is essential in these sixth through ninth embodiments is that front-mounted gear set VS is now embodied shiftably, i.e., by the closure of certain shifting elements, rotation speeds of various components of front-mounted gear set VS are transferred to the (shiftable) rear-mounted gear set NS.

All four of the sixth through ninth embodiments have only one (now shiftable) front-mounted planetary gear set VS1, configured differently in each case. Rear-mounted gear set NS is embodied identically in each case, and (as in the third embodiment) six shifting elements A, B, C, D, E, A' are provided in each case. The number of speeds selectable without group shifting is accordingly identical.

Different configurations of rear-mounted gear set NS can of course be provided in other embodiments of a multiple-ratio transmission according to the present invention.

In other embodiments of a multiple-ratio transmission according to the present invention, provision can of course also be made for front-mounted gear set VS to have two shiftable front-mounted planetary gear sets or also one non-shiftable and one shiftable front-mounted planetary gear set.

Figures 6A, 6B:
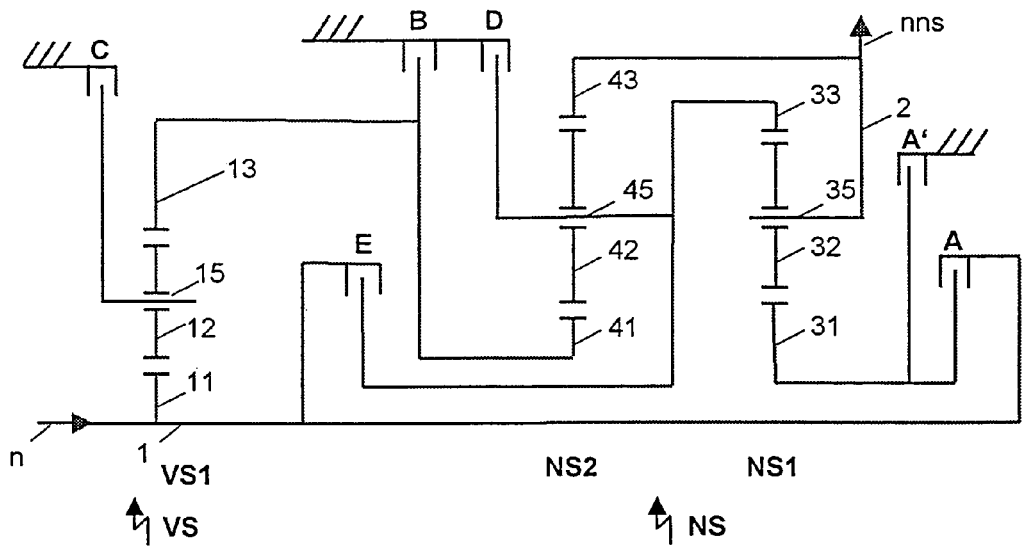
FIGS. 6A and 6B show a sixth embodiment of a multiple-ratio transmission according to the present invention having seven forward speeds and one reverse gear (according to the second approach to achieving the object)

FIG. 6A shows the sixth embodiment of a multiple-ratio transmission according to the present invention, in which a total of seven forward speeds and one reverse gear can be selected, without group shifting, in accordance with the shifting logic depicted in FIG. 6B. Advantageously, four of the six shifting elements are brakes, and the design complexity is correspondingly low especially with regard to pressure delivery to these four brakes. All three planetary transmissions, i.e., first front-mounted planetary gear set VS1 and first and second rear-mounted planetary gear sets NS1, NS2, are embodied as minus transmissions.

Drive shaft 1 (rotation speed n) is here connected to sun gear 11 of front-mounted planetary gear set VS1. Carrier 15 of front-mounted planetary gear set VS1 having planet gears 12 is lockable via third shifting element C embodied as a brake. Ring gear 13 of front-mounted planetary gear set VS1 is connected to sun gear 41 of second rear-mounted planetary gear set NS2, and is lockable via second shifting element B embodied as a brake. Sun gear 31 of first rear-mounted planetary gear set NS1 is connectable via first shifting element A, embodied as a clutch, to input drive shaft 1, and is lockable via sixth shifting element A' embodied as a brake. Ring gear 33 of first rear-mounted planetary gear set NS1, and carrier 45 having planet gears 42 of second rear-mounted planetary gear set NS2, are connected to one another, lockable via fourth shifting element D embodied as a brake, and connectable to input drive shaft 1 via fifth shifting element E embodied as a clutch. Ring gear 43 of second rear-mounted planetary gear set NS2, and carrier 35 of first rear-mounted planetary gear set NS1, are connected to one another and to output drive shaft 2 (rotation speed nns).

Figures 7A, 7B:
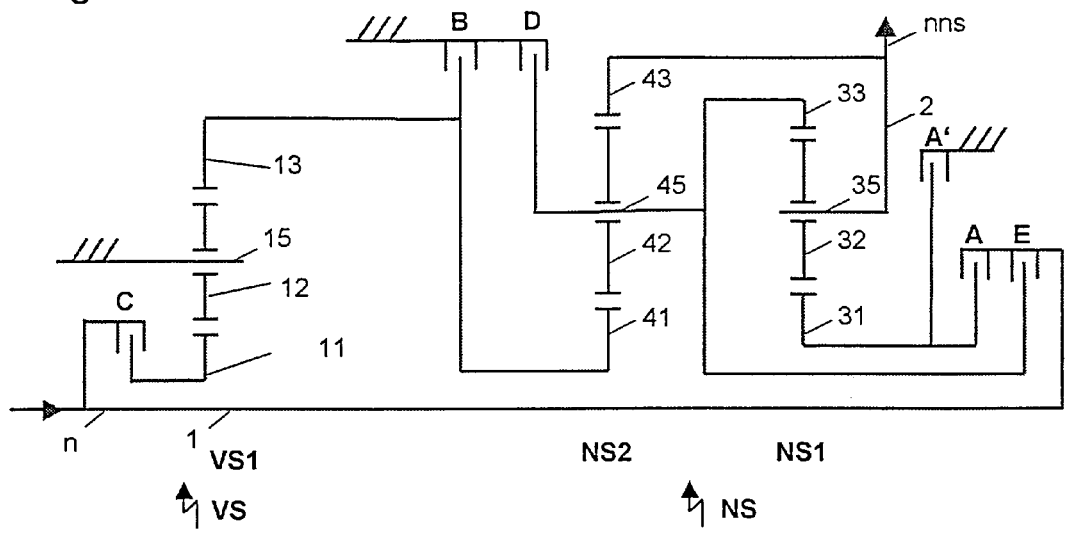
FIGS. 7A and 7B show a seventh embodiment of a multiple-ratio transmission according to the present invention having seven forward speeds and one reverse gear (according to the second approach to achieving the object)

FIG. 7A shows the seventh embodiment of a multiple-ratio transmission according to the present invention, in which once again a total of seven forward speeds and one reverse gear can be selected, without group shifting, in accordance with the shifting logic depicted in FIG. 7B. As compared with the sixth embodiment, third shifting element C is now embodied as a clutch, and the torque to be transferred through it is advantageously less. Its component dimensioning is correspondingly more favorable. All three planetary gear transmissions, i.e., first front-mounted planetary gear set VS1 and first and second rear-mounted planetary gear sets NS1, NS2, are once again embodied as minus transmissions.

As depicted in FIG. 7A, sun gear 11 of front-mounted planetary gear set VS1 is now connectable to input drive shaft 1 (rotation speed n) via third shifting element C embodied as a clutch. Carrier 15 of front-mounted planetary gear set VS1 having planet gears 12 is locked. Ring gear 13 of front-mounted planetary gear set VS1 is connected to sun gear 41 of second rear-mounted planetary gear set NS2, and is lockable via second shifting element B embodied as a brake. The configuration of the shiftable rear-mounted gear set NS otherwise corresponds to that in the sixth embodiment.

Figures 8A, 8B:
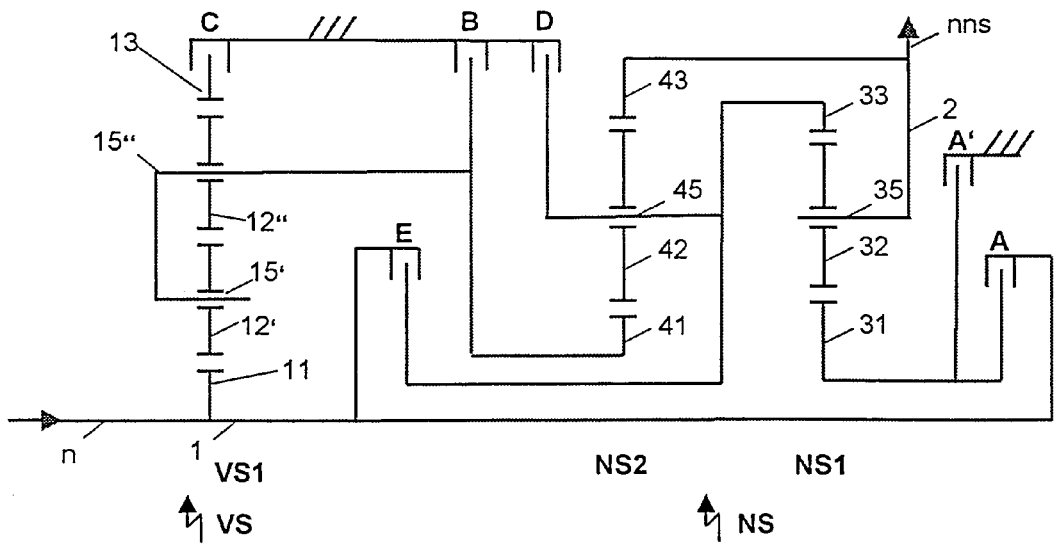
FIGS. 8A and 8B show an eighth embodiment of a multiple-ratio transmission according to the present invention having seven forward speeds and one reverse gear (according to the second approach to achieving the object)

FIG. 8A shows the eighth embodiment of a multiple-ratio transmission according to the present invention, in which once again a total of seven forward speeds and one reverse gear can be selected, without group shifting, in accordance with the shifting logic depicted in FIG. 8B. As in the sixth embodiment, four of the six shifting elements are advantageously embodied as brakes, with the known advantages in terms of design complexity. In contrast to the sixth and seventh embodiments, front-mounted planetary gear set VS1 is now embodied as a plus transmission. The relative rotation speeds at the planet gears of front-mounted planetary gear set VS1 are correspondingly favorable. In addition, the ratio spacings are more harmonious than in the sixth and seventh embodiments.

As depicted in FIG. 8A, the first (and only) shiftable front-mounted gear set VS1 is embodied as a double-planet gear set and encompasses a sun gear 11, a ring gear 13, and two coupled carriers 15', 15" having inner and outer planet gears 12', 12". Sun gear 11 is connected to input drive shaft 1 (rotation speed n). Ring gear 13 is lockable via third shifting element C embodied as a brake. Coupled carriers 15', 15" are connected to sun gear 41 of second rear-mounted planetary gear set NS2, and are lockable via second shifting element B embodied as a brake. The configuration of shiftable rear-mounted gear set NS otherwise corresponds to that in the sixth and seventh embodiments.

Figures 9A, 9B:
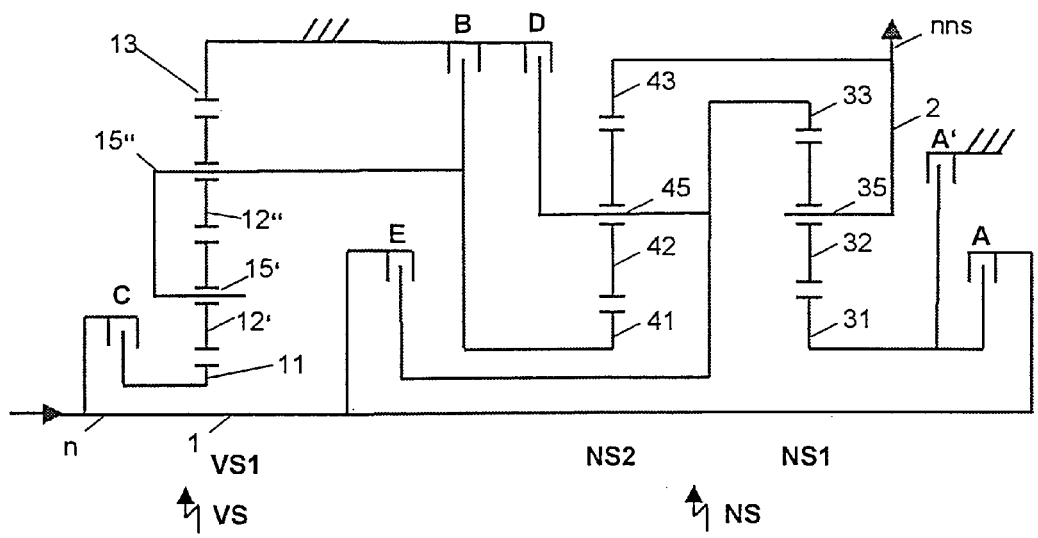
FIGS. 9A and 9B show a ninth embodiment of a multiple-ratio transmission according to the present invention having seven forward speeds and one reverse gear (according to the second approach to achieving the object)

FIG. 9A shows the ninth embodiment of a multiple-ratio transmission according to the present invention, in which once again a total of seven forward speeds and one reverse gear can be selected, without group shifting, in accordance with the shifting logic depicted in FIG. 9B. As in the seventh embodiment, third shifting element C is now embodied as a clutch, and the torque to be transferred through it is advantageously less than in the sixth and eighth embodiments. As in the eighth embodiment, front-mounted planetary gear set VS1 is embodied as a plus transmission.

As depicted in FIG. 9A, the first (and only) shiftable front-mounted gear set VS1 is embodied as a double-planet gear set and encompasses a sun gear 11, a ring gear 13, and two coupled carriers 15', 15" having inner and outer planet gears 12', 12". Sun gear 11 is connectable to input drive shaft 1 (rotation speed n) via third shifting element C embodied as a clutch. Ring gear 13 is locked. Coupled carriers 15', 15" are connected to sun gear 41 of second rear-mounted planetary gear set NS2, and are lockable via second shifting element B embodied as a brake. The configuration of the shiftable rear-mounted gear set NS otherwise corresponds to that in the sixth through eighth embodiments.

Exemplifying the third approach to achieving the object of the present invention, a tenth embodiment of a multiple-ratio transmission according to the present invention will now be explained with reference to FIGS. 10A and 10B. This tenth embodiment encompasses a first non-shiftable front-mounted planetary gear set VS1, two shiftable rear-mounted planetary gear sets NS1 and NS2, and six shifting elements A, B, D, E, D', A'. According to the present invention the free shaft of rear-mounted gear set NS, embodied as a two-carrier four shaft transmission, to which fourth shifting element D is connected is connected to a further fifth shifting element D', and the free shaft of rear-mounted gear set NS to which first shifting element A is connected is connected to a further sixth shifting element A'. The first four shifting elements A, B, D, E are embodied as clutches, the fifth and sixth shifting elements D', A' as brakes.

Input drive shaft 1 is here connected to sun gear 11 of first front-mounted planetary gear set VS1, and is connectable via fourth clutch E to carrier 45 of planet gears 42 of second rear-mounted planetary gear set NS2 and to ring gear 33, linked to said carrier 45, of first rear-mounted planetary gear set NS1, and via first clutch A to sun gear 31 of first rear-mounted planetary gear set NS1. Ring gear 13 of first front-mounted planetary gear set VS1 is locked. Carrier 15 of planet gears 12 of first front-mounted planetary gear set VS1 is connectable via second clutch B to sun gear 41 of second rear-mounted planetary gear set NS2, and via third clutch D to carrier 45 of second rear-mounted planetary gear set VS2. Carrier 45 of second rear-mounted planetary gear set NS2, and ring gear 33, connected to said carrier 45, of first rear-mounted planetary gear set NS1, are lockable via brake D'. Sun gear 31 of first rear-mounted planetary gear set NS1 is lockable via brake A'. Carrier 35 of planet gears 32 of first rear-mounted planetary gear set NS1, ring gear 43 of second rear-mounted planetary gear set NS2, and output drive shaft 3 (rotation speed nns) are connected to one another.

Figures 10A, 10B:
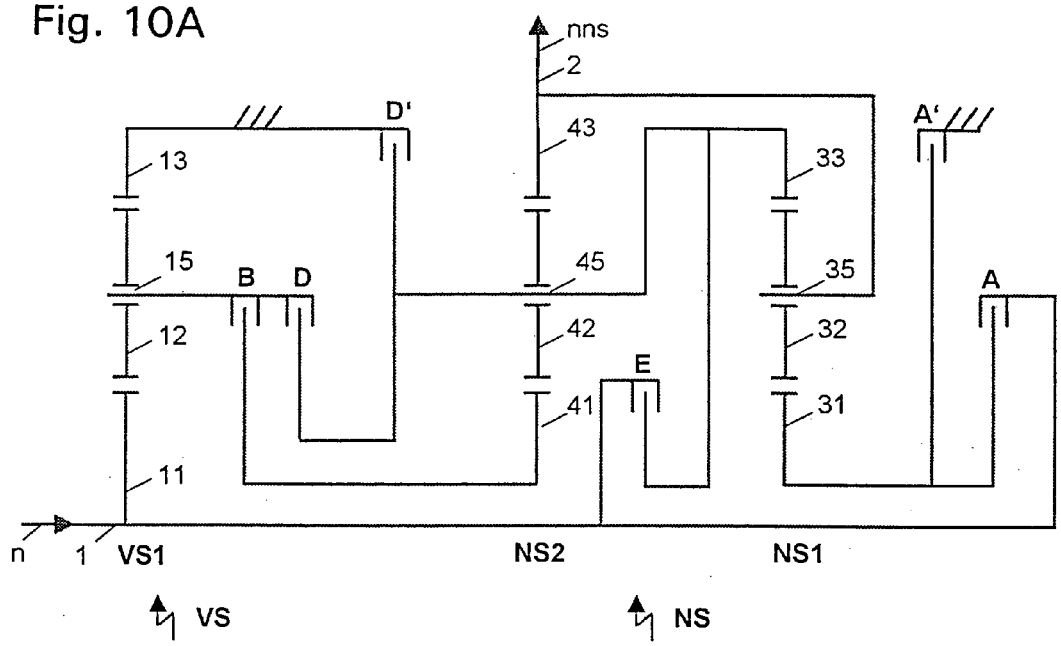
FIGS. 10A and 10B show a tenth embodiment of a multiple-ratio transmission according to the present invention having seven forward speeds and one reverse gear (according to the third approach to achieving the object)

By selective shifting of the six shifting elements, a total of seven forward speeds and one reverse gear can be selected in accordance with the shifting logic depicted in FIG. 10B. Like the fifth embodiment of the present invention already described above, this tenth embodiment according to the present invention of the multiple-ratio transmission is also particularly suitable for a front-transverse application. As a result of the above-described component coupling of the two rear-mounted planetary gear sets NS1, NS2 and their linkage in terms of power flow by way of clutches A, E, and brake A', the physical arrangement of the two shifting elements A, A' on the transmission side facing away from the input drive side, i.e., physically downstream (in the power flow direction) from all the planetary gear sets preferably arranged coaxially with input drive shaft 1, is advantageous, as is the physical arrangement of clutch E between the two rear-mounted planetary gear sets NS2 and NS1. This makes possible an output drive approximately at the center of the transmission, which is advantageous for a front-transverse application.

A further, eleventh embodiment of a multiple-ratio transmission according to the present invention, exemplifying the third approach to achieving the object of the present invention, will now be explained with reference to FIGS. 11A and 11B. The essential difference from the tenth embodiment of the present invention described above is the configuration of rear-mounted gear set NS, now with coupled sun gears.

Figures 11A, 11B:
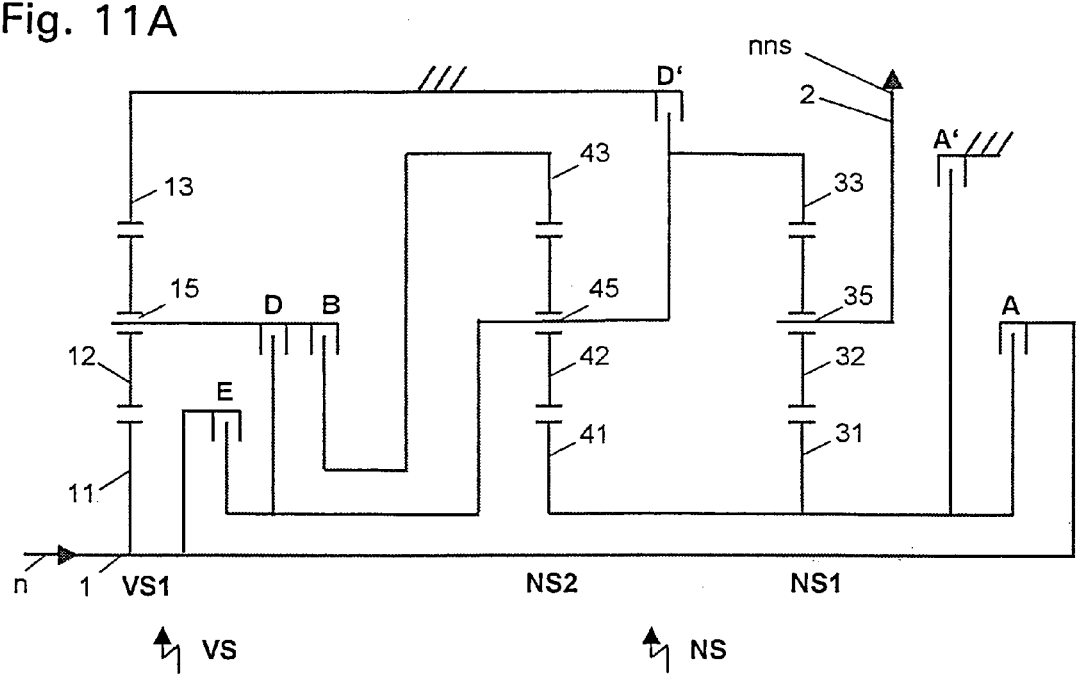
FIGS. 11A and 11B show an eleventh embodiment of a multiple-ratio transmission according to the present invention having seven forward speeds and one reverse gear (according to the third approach to achieving the object)

As depicted in FIG. 11A, rear-mounted gear set NS comprises a first and a second rear-mounted planetary gear set NS1 and NS2, their sun gears 31, 41 being coupled and ring gear 33 of first rear-mounted planetary gear set NS1 being coupled to carrier 45 of second rear-mounted planetary gear set NS2. The configuration of front-mounted gear set VS with only one first, non-shiftable front-mounted planetary gear set VS1 corresponds to that of the tenth embodiment, described previously, of the multiple-ratio transmission according to the present invention. Six shifting elements A, B, D, E, D', A' are provided. Input drive shaft 1 is connected to sun gear 11 of first front-mounted planetary gear set VS1. In addition, input drive shaft 1 is connectable via first shifting element A to sun gear 31 of first rear-mounted planetary gear set NS1, and via fourth shifting element E to carrier 45 of second rear-mounted planetary gear set NS2 and to ring gear 33, linked thereto, of first rear-mounted planetary gear set NS1. Ring gear 13 of first front-mounted planetary gear set VS1 is locked. Carrier 15 of first front-mounted planetary gear set VS1 is connectable via second shifting element B to ring gear 43 of second rear-mounted planetary gear set NS2, and via third shifting element D to carrier 45 of second rear-mounted planetary gear set NS2 and to ring gear 33, connected to said carrier 45, of first rear-mounted planetary gear set NS1. Carrier 45 of second rear-mounted planetary gear set NS2, and ring gear 33, connected to said carrier 45, of first rear-mounted planetary gear set NS1, are lockable via fifth shifting element D'. The connected sun gears 31, 41 of first and second rear-mounted planetary gear sets NS1, NS2 are lockable via sixth shifting element A'. Carrier 35 of first rear-mounted planetary gear set NS1 constitutes the output drive of rear-mounted gear set NS, and is connected to output drive shaft 3 (rotation speed nns).

As depicted in FIG. 11B, by selective shifting of shifting elements A, B, D, E, D', and A' a total of seven forward speeds and one reverse gear can be selected without group shifting, with a favorable ratio spacing and a wide spread. In particularly advantageous fashion, this eleventh embodiment of a multiple-ratio transmission according to the present invention reduces the reactive power of rear-mounted gear set NS when first gear is engaged.

A twelfth embodiment of a multiple-ratio transmission according to the present invention, exemplifying the fourth approach to achieving the object of the present invention, will now be explained with reference to FIG. 12A. This twelfth embodiment encompasses a first, non-shiftable front-mounted planetary gear set VS1, two shiftable rear-mounted planetary gear sets NS1 and NS2, and seven shifting elements A, B, C, D, E, D', A'. As in the tenth and eleventh embodiments of the present invention, the free shaft of rear-mounted gear set NS, embodied as a two-carrier four-shaft transmission, that is connected to fourth shifting element D is connected to a further sixth shifting element D', and the free shaft of rear-mounted gear set NS that is connected to first shifting element A is connected to a further seventh shifting element A'.

Figures 12A, 12B:
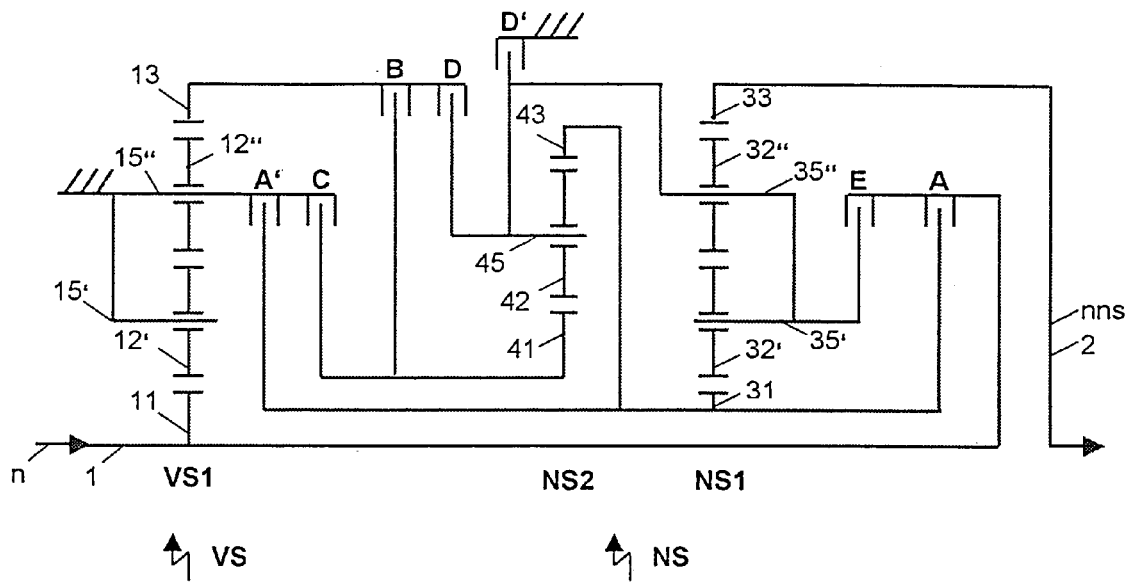
FIGS. 12A and 12B show a twelfth embodiment of a multiple-ratio transmission according to the present invention having ten forward speeds and one reverse gear (according to the fourth approach to achieving the object)

As depicted in FIG. 12A, shifting elements A, B, D, E are embodied as clutches, and shifting elements C, D', and A' as brakes. The first, non-shiftable front-mounted planetary gear set VS1 is embodied as a plus transmission with double planets, its carriers 15' and 15" of inner and outer planet gears 12' and 12" being coupled. First rear-mounted planetary gear set NS1 is also embodied as a double-planet gear set having coupled carriers 35' and 35" of inner and outer planet gears 32' and 32".

Input drive shaft 1 (rotation speed n) is connected to sun gear 11 of first front-mounted planetary gear set VS1, and is connectable via first shifting element A to sun gear 31 of first rear-mounted planetary gear set NS1. In addition, input drive shaft 1 is connectable via fifth shifting element E to coupled carriers 35', 35" of first rear-mounted planetary gear set NS1, and to carrier 45, coupled to carriers 35', 35" of first rear-mounted planetary gear set NS1, of planet gears 42 of second rear-mounted planetary gear set NS2. Coupled carriers 15', 15" of first front-mounted planetary gear set VS1 are locked. Sun gear 31 of first rear-mounted planetary gear set NS1 is lockable via seventh shifting element A', preferably via carrier 15" of outer planet gears 12" of first front-mounted planetary gear set VS1. Sun gear 41 of second rear-mounted planetary gear set NS2 is lockable via third shifting element C, likewise preferably via carrier 15" of outer planet gears 12" of first front-mounted planetary gear set VS1. Ring gear 13 of first front-mounted planetary gear set VS1 is connectable via second shifting element B to sun gear 41 of second rear-mounted planetary gear set NS2, and via fourth shifting element D to carrier 45 of second rear-mounted planetary gear set NS2. Carrier 45 of second rear-mounted planetary gear set NS2 is lockable via sixth shifting element D'. Sun gear 31 of first rear-mounted planetary gear set NS1 is connected to ring gear 43 of second rear-mounted planetary gear set NS2. Also connected are ring gear 33 of first front-mounted planetary gear set NS1, and output shaft 3 (rotation speed nns).

By selective shifting of the seven shifting elements, a total of ten forward speeds and one reverse gear can be shifted, without group shifting, in accordance with the shifting logic depicted in FIG. 12B. The first forward speed and the reverse gear have a crawler gear characteristic, similarly to the fifth embodiment described previously. As compared with the fifth embodiment, this twelfth embodiment of a multiple-ratio transmission according to the present invention requires only three gear sets, i.e., one fewer gear set, for ten forward speeds.

Figures 13A, 13B:
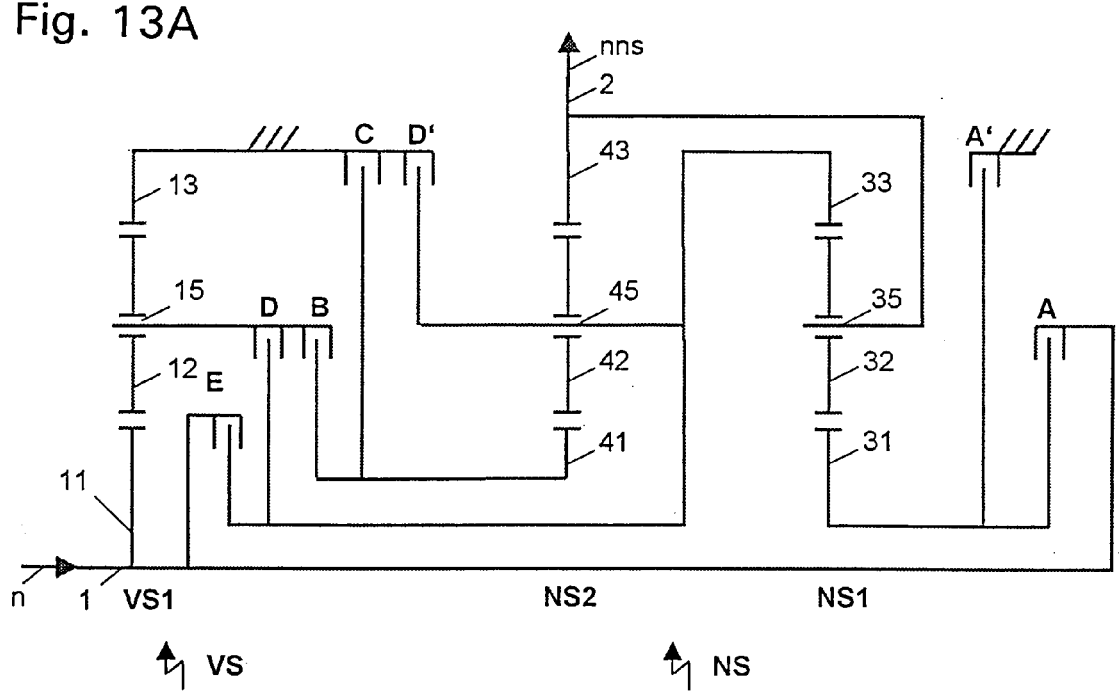
FIGS. 13A and 13B show a thirteenth embodiment of a multiple-ratio transmission according to the present invention having ten forward speeds and one reverse gear (according to the fourth approach to achieving the object)

FIG. 13A shows a thirteenth embodiment of a multiple-ratio transmission according to the present invention, exemplifying the fourth approach to achieving the object of the invention. Proceeding from the tenth embodiment previously described in detail in FIG. 10A, the multiple-ratio transmission now comprises seven shifting elements A, B, C, D, E, D', and A'. Shifting element C, which is additional as compared with the tenth embodiment, is embodied as a brake and is arranged in such a way that sun gear 41 of second rear-mounted planetary gear set NS2 can additionally be locked via said brake C.

As depicted in FIG. 13B, a total of ten forward speeds and one reverse gear can now be engaged using this additional shifting element. Advantageously, all three planetary gear sets are embodied as minus transmissions, which are favorable in terms of design complexity. As compared with the twelfth embodiment, the crawler gear characteristic of the first forward speed and the reverse gear is reduced, and the ratio spacing between the first and second forward speeds is correspondingly smaller. Like the tenth embodiment of the present invention, this thirteenth embodiment of a multiple-ratio transmission according to the present invention is also particularly suitable for a vehicle having front-transverse drive.

Figures 13C, 13D:
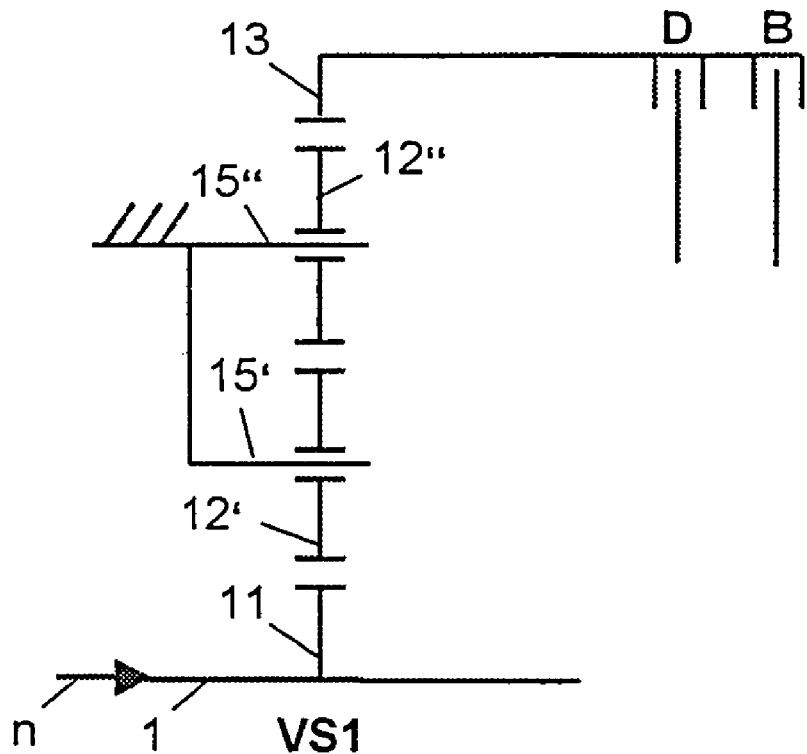
FIGS. 13C and 13D show a development of the tenth and/or eleventh and/or thirteenth embodiment of a multiple-ratio transmission according to the present invention.

In a development of the tenth and/or eleventh and/or thirteenth embodiments according to the present invention of a multiple-ratio transmission, it is proposed to embody the first, non-shiftable front-mounted planetary gear set VS1 as a plus transmission having a sun gear 11, a ring gear 13, and two coupled carriers 15', 15" having inner and outer planet gears 12', 12", as depicted in FIG. 13C. Here the coupled carriers 15', 15" of first front-mounted planetary gear set VS1 (rather than its ring gear 13) are locked, and second and third shifting elements B and D are connected to ring gear 13 of first front-mounted planetary gear set VS1 (rather than to its carrier). FIG. 13D shows the static ratio of front-mounted gear set VS of this development.

A fourteenth embodiment of a multiple-ratio transmission according to the present invention, exemplifying the fourth approach to achieving the object of the invention, will now be explained with reference to FIG. 14A. This fourteenth embodiment encompasses a first, non-shiftable front-mounted planetary gear set VS1, two shiftable rear-mounted planetary gear sets NS1 and NS2, as well as seven shifting elements A, B, C, D, E, D', A'. As in the twelfth and thirteenth embodiments of the present invention, the free shaft of rear-mounted gear set NS, embodied as a two-carrier four shaft transmission, to which fourth shifting element D is connected is connected to a further sixth shifting element D', and the free shaft of rear-mounted gear set NS to which first shifting element A is connected is connected to a further seventh shifting element A'.

Figures 14A, 14B:
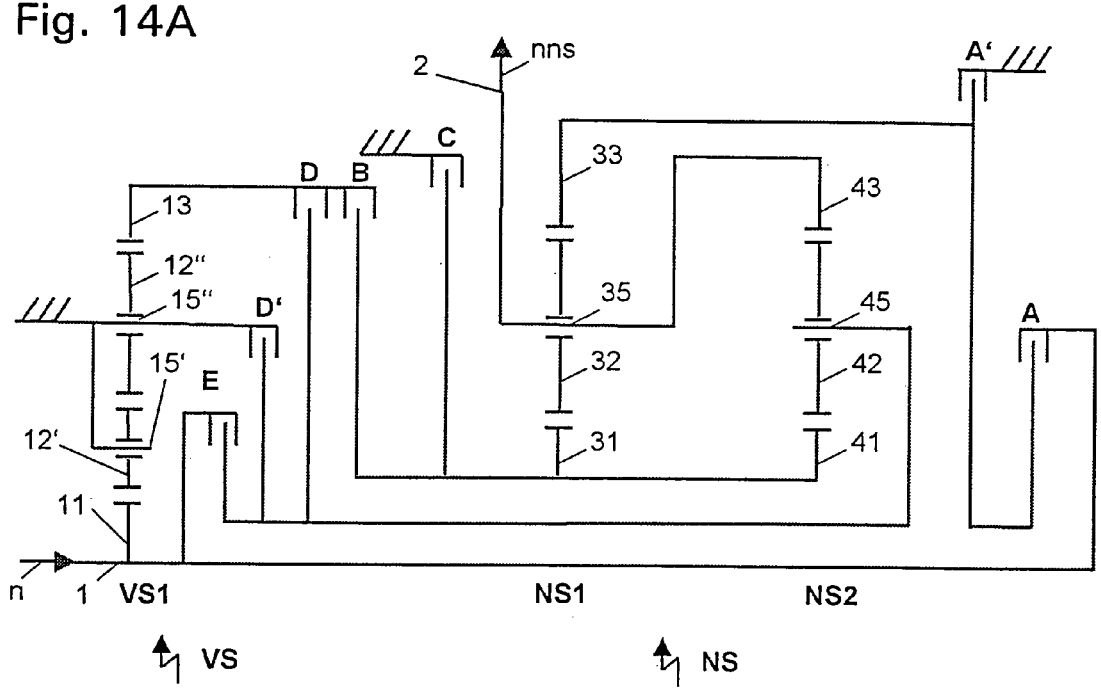
FIGS. 14A and 14B show a fourteenth embodiment of a multiple-ratio transmission according to the present invention having ten forward speeds and one reverse gear (according to the fourth approach to achieving the object)

As depicted in FIG. 14A, shifting elements A, B, D, E are embodied as clutches, and shifting elements C, D', A' as brakes. First front-mounted planetary gear set VS1 is embodied as a plus transmission having double planets, its carriers 15' and 15" of inner and outer planet gears 12' and 12" being coupled. Input drive shaft 1 (rotation speed n) is connected to sun gear 11 of first front-mounted planetary gear set VS1, and connectable via first shifting element A to ring gear 33 of first rear-mounted planetary gear set NS1. In addition, drive shaft 1 is connectable via fifth shifting element E to carrier 45 of planet gears 42 of second rear-mounted planetary gear set NS2. Coupled carriers 15' and 15" of first front-mounted planetary gear set VS1 are locked. Sun gear 31 of first rear-mounted planetary gear set NS1 is connected to sun gear 41 of second rear-mounted planetary gear set NS2. Ring gear 33 of first rear-mounted planetary gear set NS1 is lockable via seventh shifting element A'. Carrier 45 of planet gears 42 of second rear-mounted planetary gear set NS2 is lockable via sixth shifting element D', preferably via carrier 15" of outer planet gears 12" of first front-mounted planetary gear set VS1. Ring gear 13 of first front-mounted planetary gear set VS1 is connectable via second shifting element B to sun gear 31 of first rear-mounted planetary gear set NS1 and to the linked sun gear 41 of second rear-mounted planetary gear set NS2, and connectable via fourth shifting element D to carrier 45 of second rear-mounted planetary gear set NS2. Sun gear 31 of first rear-mounted planetary gear set NS1, and the linked sun gear 41 of second rear-mounted planetary gear set NS2, are lockable via third shifting element C. Also connected are carrier 35 of planet gears 32 of first rear-mounted planetary gear set NS1, ring gear 43 of second rear-mounted planetary gear set NS2, and output shaft 3 (rotation speed nns).

By selective shifting of the seven shifting elements, a total of ten forward speeds and one reverse gear can be engaged, without group shifting, in accordance with the shifting logic depicted in FIG. 14B. As compared with the thirteenth embodiment, in this fourteenth embodiment of a multiple-ratio transmission according to the present invention, the reactive power of rear-mounted gear set NS is reduced in particularly advantageous fashion when first gear is engaged.

In a configuration of the fourteenth embodiment of a multiple-ratio transmission according to the present invention, provision can also be made for engaging only nine forward speeds rather than the possible ten, omitting the fifth gear depicted in FIG. 14B. The spacing of this nine-speed transmission is very harmonious.

A further, fifteenth embodiment of a multiple-ratio transmission according to the present invention, exemplifying the fourth approach to achieving the object of the present invention, will be described with reference to FIGS. 15A and 15B. This fifteenth embodiment is based on the rear-mounted gear set arrangement of the twelfth embodiment as shown in FIG. 12A, and now has two coupled, non-shiftable front-mounted planetary gear sets VS1 and VS2 in front-mounted gear set VS. Furthermore, seventh shifting element A' is now embodied as a clutch. As a result of these changes, twelve rather than ten forward speeds can be engaged.

Figures 15A, 15B:
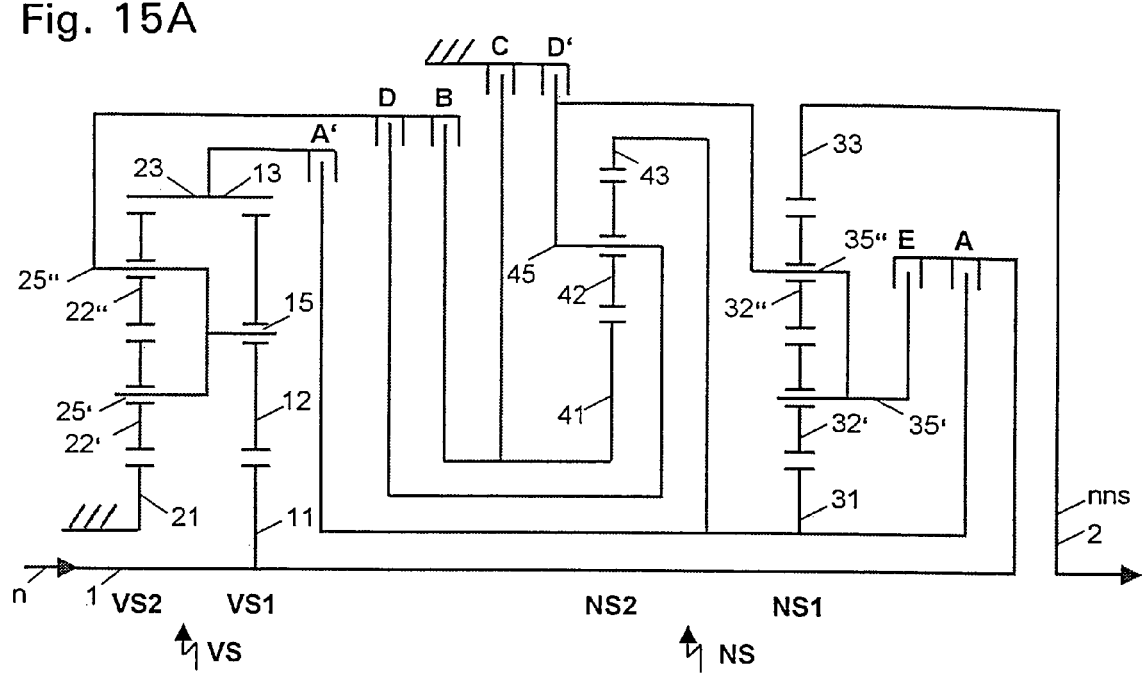
FIGS. 15A and 15B show a fifteenth embodiment of a multiple-ratio transmission according to the present invention having twelve forward speeds and one reverse gear (according to the fourth approach to achieving the object).

As depicted in FIG. 15A, input drive shaft 1 (rotation speed n) is connected to sun gear 11 of first front-mounted planetary gear set VS1, and is connectable via first shifting element A, embodied as a clutch, to sun gear 31 of first rear-mounted planetary gear set NS1 and via fifth shifting element E, embodied as a clutch, to coupled carriers 35', 35" of inner and outer planet gears 32', 32" of first rear-mounted planetary gear set NS1 and to carrier 45, coupled to carriers 35', 35" of first rear-mounted planetary gear set NS1, of planet gears 42 of second rear-mounted planetary gear set NS2. Carrier 25' of inner planet gears 22' of second front-mounted planetary gear set VS2, carrier 25" of outer planet gears 22" of second front-mounted planetary gear set VS2, and carrier 15 of planet gears 12 of first front-mounted planetary gear set VS1 are connected to one another. Sun gear 21 of second front-mounted planetary gear set VS2 is locked. Ring gear 13 of first front-mounted planetary gear set VS1 and ring gear 23 of second front-mounted planetary gear set VS2 are connected to one another, and are connectable via seventh shifting element A', embodied as a clutch, to sun gear 31 of first rear-mounted planetary gear set NS1. Carrier 25" of outer planet gears 22" of second front-mounted planetary gear set VS2 is connectable via fourth shifting element D, embodied as a clutch, to carrier 45 of second rear-mounted planetary gear set NS2, and via shifting element B, embodied as a clutch, to sun gear 41 of second rear-mounted planetary gear set NS2. Sun gear 41 of second rear-mounted planetary gear set NS2 is lockable via third shifting element C embodied as a brake. Carrier 45 of second rear-mounted planetary gear set NS2 is lockable via sixth shifting element D' embodied as a brake. Sun gear 31 of first rear-mounted planetary gear set NS1, and ring gear 43 of second rear-mounted planetary gear set NS2, are connected to one another. Also connected are ring gear 33 of first rear-mounted planetary gear set NS1 and output drive shaft 3 (rotation speed nns).

By selective shifting of the seven shifting elements, a total of twelve forward speeds and one reverse gear can advantageously be engaged in accordance with the shifting logic depicted in FIG. 15B.

Reference Characters
VS Front-mounted gear set
VS1 First front-mounted planetary gear set
VS2 Second front-mounted planetary gear set
NS Rear-mounted gear set
NS1 First rear-mounted planetary gear set
NS2 Second rear-mounted planetary gear set
A, B, C, D, First through seventh shifting elements E, D', A'
n Input rotation speed of input drive shaft
nns Output rotation speed of rear-mounted gear set NS
1 Input drive shaft
2 Output drive shaft
11 Sun gear of gear set VS1
12 Planet gear of gear set VS1
12k Small planet gear of gear set VS1
12g Large planet gear of gear set VS1
12' Inner planet gear of gear set VS1
12" Outer planet gear of gear set VS1
13 Ring gear of gear set VS1
15 Carrier of gear set VS1
15' Carrier of inner planet gears of gear set VS1
15" Carrier of outer planet gears of gear set VS1
21 Sun gear of gear set VS2
22 Planet gear of gear set VS2
22' Inner planet gear of gear set VS2
22" Outer planet gear of gear set VS2
23 3 Ring gear of gear set VS2
25 Carrier of gear set VS2
25' Carrier of inner planet gears of gear set VS2
25" Carrier of outer planet gears of gear set VS2
31 Sun gear of gear set NS1
32 Planet gear of gear set NS1
32' Inner planet gear of gear set NS1
32" Outer planet gear of gear set NS1
33 Ring gear of gear set NS1
35 Carrier of gear set NS1
35" Carrier of inner planet gears of gear set NS1
41 Carrier of outer planet gears of gear set NS1
42 Sun gear of gear set NS2
43 Planet gear of gear set NS2
45 Ring gear of gear set NS2
45 Carrier of gear set NS2

What is claimed is:
1. A multiple-ratio transmission, comprising:
a front-mounted (VS) connected to an input drive shaft (1);
a rear-mounted (NS) connected to an output drive shaft (2); and
at least six shifting elements (A, B, C, D, E, A');
wherein by selectable shifting of a maximum of the six shifting elements (A, B, C, D, E, A'), an input rotation speed (n) of the input drive shaft (1) and rotation speeds generated in the front-mounted are selectively transferable to the rear-mounted (NS) for selection of at least seven forward speeds and at least one reverse speed, so that only one shifting element, of two shifting elements presently actuated, is disengaged and one further shifting element is engaged to shift from one gear to a next higher or lower gear;
the front-mounted (VS) has one of one front-mounted planetary (VS1) and two coupled front-mounted planetary gear sets (VS1, VS2); and
the rear-mounted (NS) has a two-carrier four-shaft transmission having two shiftable rear-mounted planetary gear sets (NS1, NS2);
a first free shaft of the rear-mounted (NS) is connected to the first shifting element (A) and rotating, when the first shifting element (A) is engaged, at a rotation speed less than or equal to the input rotation speed (n) of the input drive shaft;
a second free shaft of the rear-mounted (NS) is connected at least to the second shifting element (B);
a third free shaft of the rear-mounted (NS) is connected to the fourth shifting element (D) and rotating, when the fourth shifting element (D) is engaged, at a rotation speed less than the input rotation speed (n) of the input shaft (1), the third free shaft of the rear-mounted (NS) is connected to the fifth shifting element (E) and rotating, when the fifth shifting element (E) is engaged, at the input drive rotation speed (n) of the input shaft (1); and a fourth free shaft of the rear-mounted (NS) is connected to the output drive shaft (2);

the first free shaft of the rear-mounted (NS) is additionally connected to the sixth shifting element (A') and rotates, when the sixth shifting element (A') is engaged, at a rotation speed less than the input rotation speed (n) of the input drive shaft (1).

2. The multiple-ratio transmission according to claim 1, wherein:

the first front-mounted planetary gearset (VS1) has a sun gear (11), a ring gear (13), and two coupled carriers (15', 15") having inner and outer planet gears (12', 12");

the first rear-mounted planetary gearset (NS1) is a double-planet gearset having a sun gear (31), a ring gear (33), and two coupled carriers (35', 35") having inner and outer plane gears (32', 32");

the second rear-mounted planetary gearset (NS2) has a sun gear (41), a ring gear (43) and a carrier (45) having planet gears (42);

the sun gear (11) of the first front-mounted planetary gearset (VS1) is locked;

the coupled carriers (15', 15") of the first front-mounted planetary gear set (VS1) are connected to the input drive shaft (1);

the ring gear (13) of the first front-mounted planetary gearset (VS1) is connectable via the sixth shifting element (A') to the sun gear (31) of the first rear-mounted planetary gearset (NS1), and via the second shifting element (B) to the sun gear (41) of the second rear-mounted planetary gearset (NS2);

the sun gear (31) of the first rear-mounted planetary gearset (NS1) is connectable via the first shifting element (A) to the input drive shaft (1);

the coupled carriers (35', 35") of the first rear-mounted planetary gear set (NS1) are connected to the carrier (45) of the second rear-mounted planetary gear set (NS2) and connectable via the fifth shifting element (E) to the input drive shaft (1);

the sun gear (41) of the second rear-mounted planetary gearset (NS2) is lockable via the third shifting element (C);

the planet gears (42) of the second rear-mounted planetary gear set (NS2) and the outer planet gears (32") of the first rear-mounted planetary gear set (NS1) are combined;

the carrier (45) of the second rear-mounted planetary gearset (NS2) is lockable via the fourth shifting element (D); and the ring gear (33) of the first rear-mounted planetary gearset (NS1) and the ring gear (43) of the second rear-mounted planetary gearset (NS2) are connected to one another and to the output drive shaft (3).

3. The multiple-ratio transmission according to claim 1, wherein:

the first front-mounted planetary gearset (VS1) has a sun gear (11), a ring gear (13), and two coupled carriers (15', 15") having inner and outer planet gears (12', 12");

the two rear-mounted planetary gearsets (NS1, NS2) each have a sun gear (31, 41), a ring gear (33, 43), and a carrier (35, 45) having planet gears (32, 42);

the sun gear (11) of the first front-mounted planetary gearset (VS1) is connected to the input drive shaft (1);

the coupled carriers (15', 15") of the first front-mounted planetary gear set (VS1) are connectable via the third shifting element (C) to the sun gear (41) of the second rear-mounted planetary gearset (NS2);

the ring gear (13) of the first front-mounted planetary gearset (VS1) is locked;

the sun gear (31) of the first rear-mounted planetary gearset (NS1) is connectable via the first shifting element (A) to the input drive shaft (1) and is lockable via the sixth shifting element (A');

the sun gear (41) of the second rear-mounted planetary gearset (NS2) is lockable via the second shifting element (B);

the carrier (45) of the second rear-mounted planetary gearset (NS2) and the ring gear (33) of the first rear-mounted planetary gearset (NS1) are connected to one another, and connectable via the fifth shifting element (E) to the input drive shaft (1), and are lockable via the fourth shifting element (D); and the carrier (35) of the first rear-mounted planetary gearset (NS1) and the ring gear (43) of the second rear-mounted planetary gearset (NS2) are connected to one another and to the output drive shaft (3).

4. The multiple-ratio transmission according to claim 1, wherein:

the first front-mounted planetary gearset (VS1) has a sun gear (11), a ring gear (13), and a carrier (15) having staged planet gears constituted by small planet gears (12k) and large planet gears (12g);

the two rear-mounted planetary gear sets (NS1, NS2) each have a sun gear (31, 41), a ring gear (33, 43), and a carrier (35, 45) having planet gears (32, 42);

the sun gear (11) of the first front-mounted planetary gearset (VS1) is connected to the input drive shaft (1);

the carrier (15) of the first front-mounted planetary gearset (VS1) is locked;

the small planet gears (12k) of the first front-mounted planetary gear set (VS1) mesh with its sun gear (11), and the large planet gears (12g) of the first front-mounted planetary gearset (VS1) mesh with its ring gear (13);

the ring gear (13) of the first front-mounted planetary gearset (VS1) is connectable via the third shifting element (C) to the sun gear (41) of the second rear-mounted planetary gearset (NS2);

the sun gear (31) of the first rear-mounted planetary gearset (NS1) is connectable via the first shifting element (A) to the input drive shaft (1) and is lockable via the sixth shifting element (A');

the sun gear (41) of the second rear-mounted planetary gearset (NS2) is lockable via the second shifting element (B);

the carrier (45) of the second rear-mounted planetary gearset (NS2) and the ring gear (33) of the first rear-mounted planetary gearset (NS1) are connected to one another, are connectable via the fifth shifting element (E) to the input drive shaft (1), and are lockable via the fourth shifting element (D); and the carrier (35) of the first rear-mounted planetary gearset (NS1) and the ring gear (43) of the second rear-mounted planetary gearset (NS2) are connected to one another and to the output drive shaft (3).

5. The multiple-ratio transmission according to claim 1, wherein:

the first front-mounted planetary gearset (VS1) has a sun gear (11), a ring gear (13), and a carrier (15) having staged planet gears having small planet gears (12k) and large planet gears (12g);

the two rear-mounted planetary gear sets (NS1, NS2) each comprise a sun gear (31, 41), a ring gear (33, 43), and a carrier (35, 45) having planet gears (32, 42);

the sun gear (11) of the first front-mounted planetary gearset (VS1) is connected to the input drive shaft (1);

the carrier (15) of the first front-mounted planetary gearset (VS1) is locked;

the small planet gears (12k) of the first front-mounted planetary gear set (VS1) engage with its sun gear (11), and the large planet gears (12g) of the first front-mounted planetary gearset (VS1) engage with its ring gear (13);

the sun gears (31, 41) of the two rear-mounted planetary gear sets (NS1, NS2) are connected to one another, are connectable via the third shifting element (C) to the ring gear (13) of the first front-mounted planetary gear set (VS1), and are lockable via the second shifting element (B);

the ring gear (33) of the first rear-mounted planetary gearset (NS1) is connectable via the first shifting element (A) to the input drive shaft (1) and is lockable via the sixth shifting element (A');

the carrier (45) of the second rear-mounted planetary gearset (NS2) is connectable via the fifth shifting element (E) to the input drive shaft (1) and is lockable via the fourth shifting element (D), in particular via the carrier (15) of the first front-mounted planetary gearset (VS1); and the carrier (35) of the first rear-mounted planetary gearset (NS1) and the ring gear (43) of the second rear-mounted planetary gearset (NS2) are connected to one another and to the output drive shaft (3).

6. The multiple-ratio transmission according to claim 1, wherein:

the two front-mounted planetary gear sets (VS1, VS2) and the two rear-mounted planetary gear sets (NS1, NS2) each comprise a sun gear (11, 21, 31, 41), a ring gear (13, 23, 33, 43), and a carrier (15, 25, 35, 45) having planet gears (12, 22, 32, 42);

the sun gear (11) of the first front-mounted planetary gearset (VS1) is connected to the input drive shaft (1);

the ring gear (13) of the first front-mounted planetary gearset (VS1) is locked;

the sun gear (21) of the second front-mounted planetary gearset (VS2) is connected to the input drive shaft (1);

the carrier (25) of the second front-mounted planetary gearset (VS2) is locked;

the sun gears (31, 41) of the two rear-mounted planetary gear sets (NS1, NS2) are connected to one another, are connectable via the second shifting element (B) to the carrier (15) of the first front-mounted planetary gearset (VS1), and are connectable via the third shifting element (C) to the ring gear (23) of the second front-mounted planetary gearset (VS2);

the ring gear (43) of the second rear-mounted planetary gearset (VS2) and the ring gear (33) of the first rear-mounted planetary gearset (NS1) are connected to one another, are connectable via the first shifting element (A) to the input drive shaft (1), and are lockable via the sixth shifting element (A');

the carrier (45) of the second rear-mounted planetary gearset (NS2) is connectable via the fifth shifting element (E) to the input drive shaft (1), and via the fourth shifting element (D) to the carrier (15) of the first front-mounted planetary gear set (VS1); and the carrier (35) of the first rear-mounted planetary gearset (NS1) is connected to the output drive shaft (3).

7. The multiple-ratio transmission according to claim 1, wherein:

the first shiftable front-mounted planetary gearset (VS1) and the two rear-mounted planetary gear sets (NS1, NS1) each have a sun gear (11, 31, 41), a ring gear (13, 33, 43), and a carrier (15, 35, 45) having planet gears (12, 32, 42);

the sun gear (11) of the first front-mounted planetary gearset (VS1) is connected to the input drive shaft (1);

the carrier (15) of the first front-mounted planetary gearset (VS1) is lockable via the third shifting element (C);

the ring gear (13) of the first front-mounted planetary gearset (VS1) is connected to the sun gear (41) of the second rear-mounted planetary gearset (NS2) and is lockable via the second shifting element (B);

the sun gear (31) of the first rear-mounted planetary gearset (NS1) is connectable via the first shifting element (A) to the input drive shaft (1) and is lockable via the sixth shifting element (A');

the ring gear (33) of the first rear-mounted planetary gearset (NS1) and the carrier (45) of the second rear-mounted planetary gearset (NS2) are connected to one another, are lockable via the fourth shifting element (D), and are connectable via the fifth shifting element (E) to the input drive shaft (1); and the ring gear (43) of the second rear-mounted planetary gearset (NS2) and the carrier (35) of the first rear-mounted planetary gearset (NS1) are connected to one another and to the output drive shaft (2).

8. The multiple-ratio transmission according to claim 1, wherein:

the first shiftable front-mounted planetary gearset (VS1) and the two rear-mounted planetary gear sets (NS1, NS1) each have a sun gear (11, 31, 41), a ring gear (13, 33, 43), and a carrier (15, 35, 45) having planet gears (12, 32, 42);

the sun gear (11) of the first front-mounted planetary gearset (VS1) is connectable via the third shifting element (C) to the input drive shaft (1);

the carrier (15) of the first front-mounted planetary gearset (VS1) is locked;

the ring gear (13) of the first front-mounted planetary gearset (VS1) and the sun gear (41) of the second rear-mounted planetary gearset (NS2) are connected to one another and are lockable via the second shifting element (B);

the sun gear (31) of the first rear-mounted planetary gearset (NS1) is connectable via the first shifting element (A) to the input drive shaft (1) and is lockable via the sixth shifting element (A');

the ring gear (33) of the first rear-mounted planetary gearset (NS1) and the carrier (45) of the second rear-mounted planetary gearset (NS2) are connected to one another, and lockable via the fourth shifting element (D), and are connectable via the fifth shifting element (E) to the input drive shaft (1); and the ring gear (43) of the second rear-mounted planetary gearset (NS2) and the carrier (35) of the first rear-mounted planetary gearset (NS1) are connected to one another and to the output drive shaft (2).

9. The multiple-ratio transmission according to claim 1, wherein:

the first shiftable front-mounted plarnetary gearset (VS1) has a sun gear (11), a ring gear (13), and two coupled carriers (15', 15") having inner and outer planet gears (12', 12");

the two rear-mounted planetary gear sets (NS1, NS1) each comprise a sun gear (31, 11), a ring gear (33, 43), and a carrier (35, 45) having planet gears (32, 42);

the sun gear (11) of the first front-mounted planetary gearset (VS1) is connected to the input drive shaft (1);

the coupled carriers (15', 15") of the first front-mounted planetary gear set (VS1) are connected to the sun gear (41) of the second rear-mounted planetary gearset (NS2) and are lockable via the second shifting element (B);

the ring gear (13) of the first front-mounted planetary gearset (VS1) is lockable via the third shifting element (C);

the sun gear (31) of the first rear-mounted planetary gearset (NS1) is connectable via the first shifting element (A) to the input drive shaft (1) and is lockable via the sixth shifting element (A');

the ring gear (33) of the first rear-mounted planetary gearset (NS1) and the carrier (45) of the second rear-mounted planetary gearset (NS2) are connected to one another, are lockable via the fourth shifting element (D), and are connectable via the fifth shifting element (E) to the input drive shaft (1); and the ring gear (43) of the second rear-mounted planetary gearset (NS2) and the carrier (35) of the first rear-mounted planetary gearset (NS1) are connected to one another and to the output drive shaft (2).

10. The multiple-ratio transmission according to claim 1, wherein:

the first shiftable front-mounted planetary gearset (VS1) has a sun gear (11), a ring gear (13), and two coupled carriers (15', 15") having inner and outer planet gears (12', 12");

the two rear-mounted planetary gear sets (NS1, NS1) each have a sun gear (31, 41), a ring gear (33, 43), and a carrier (35, 45) having planet gears (32, 42);

the sun gear (11) of the first front-mounted planetary gearset (VS1) is connectable via the third shifting element (C) to the input drive shaft (1);

the coupled carriers (15', 15") of the first front-mounted planetary gear set (VS1) and the sun gear (41) of the second rear-mounted planetary gearset (NS2) are connected to one another and are lockable via the second shifting element (B);

the ring gear (13) of the first front-mounted planetary gearset (VS1) is locked;

the sun gear (31) of the first rear-mounted planetary gearset (NS1) is connectable via the first shifting element (A) to the input drive shaft (1) and is lockable via the sixth shifting element (A');

the ring gear (33) of the first rear-mounted planetary gearset (NS1) and the carrier (45) of the second rear-mounted planetary gearset (NS2) are connected to one another, are lockable via the fourth shifting element (D), and are connectable via the fifth shifting element (E) to the input drive shaft (1); and the ring gear (43) of the second rear-mounted planetary gearset (NS2) and the carrier (35) of the first rear-mounted, planetary gearset (NS1) are connected to one another and to the output drive shaft (2).

11. A multiple-ratio transmission, comprising:

a front-mounted (VS) connected to an input drive shaft (1);

a rear-mounted (NS) connected to an output drive shaft (2); and seven shifting elements (A, B, C, D, E, D', A');

wherein by selectable shifting of a maximum of the seven shifting elements (A, B, C, D, E, D', A'), an input rotation speed (n) of the input drive shaft (1) and rotation spends generated in the front-mounted gearset are selectively transferable to the rear-mounted (NS) for selection of at least seven forward speeds, so that only one shifting element, of two shifting elements presently actuated, is disengaged and one further shifting element is engaged to shift from one gear to a next higher or lower gear;

the front-mounted (VS) has one of one front-mounted planetary (VS1) and two coupled front-mounted planetary gear sets (VS1, VS2), and the front-mounted (VS) is directly connected with and continuously driven by the input drive shaft (1); and the rear-mounted (NS) has a two-carrier four-shaft transmission having two shiftable rear-mounted planetary gear sets (NS1, NS2);

a first free shaft of the rear-mounted (NS) is connected to the first shifting element (A) and rotating, when the first shifting element (A) is engaged, at a rotation speed less than or equal to the input rotation speed (n) of the input drive shaft;

a second free shaft of the rear-mounted (NS) is connected to the second and third shifting elements (B, C);

a third free shaft of the rear-mounted (NS) is connected to the fourth shifting element (D) and rotating, when the fourth shifting element (D) is engaged, at a rotation speed less than the input rotation speed (n) of the input shaft (1), the third free shaft of the rear-mounted (NS) is connected to the fifth shifting element (E) and rotating, when the fifth shifting element (E) is engaged, at the input drive rotation speed (n) of the input shaft (1); and a fourth free shaft of the rear-mounted (NS) is connected to the output drive shaft (2);

the third free shaft of the rear-mounted (NS) is additionally connected to the sixth shifting element (D') and rotates, when the sixth shifting element (D') is engaged, at a rotation speed less than the input rotation speed (n) of the input shaft (1), and the first free shaft of the rear-mounted (NS) is additionally connected to the seventh shifting element (A') and rotates, when the seventh shifting element (A') is engaged, at a rotation speed, less than the input rotation speed (n) of the input drive shaft (1).

12. The multiple-ratio transmission according to claim 11, wherein:

the first front-mounted planetary gearset (VS1) and the two rear-mounted planetary gear sets (NS1, NS2) each have a sun gear (11, 31, 41), a ring gear (13, 33, 34), and a carrier (15, 35, 45) having planet gears (12, 32, 42);

the sun gear (11) of the first front-mounted planetary gearset (VS1) is connected to the input drive shaft (1);

the ring gear (13) of the first front-mounted planetary gearset (VS1) is locked;

the sun gear (31) of the first rear-mounted planetary gearset (NS1) is connectable via the first shifting element (A) to the input drive shaft (1) and is lockable via the seventh shifting element (A');

the sun gear (41) of the second rear-mounted planetary gearset (NS2) is connectable via the second shifting element (B) to the carrier (15) of the first front-mounted planetary gearset (VS1) and is lockable via the third shifting element (C);

the carrier (45) of the second rear-mounted planetary gearset (NS2) and the ring gear (33) of the first rear-mounted planetary gearset (NS1) are connected to one another, are connectable via the fourth shifting element (D) to the carrier (15) of the first front-mounted planetary gearset (VS1), are connectable via the fifth shifting element (E) to the input drive shaft (1), and are lockable via the sixth shifting element (D'); and the carrier (35) of the first rear-mounted planetary gearset (NS1) and the ring gear (43) of the second rear-mounted planetary gearset (NS2) are connected to one another and to the output drive shaft (3).

13. The multiple-ratio transmission according to claim 11, wherein:

the first front-mounted planetary gearset (VS1) has a sun gear (11), a ring gear (13), and two coupled carriers (15', 15") having inner and outer planet gears (12', 12");

the two rear-mounted planetary gearsets (NS1, NS2) each comprise a sun gear (31, 41), a ring gear (33, 43), and a carrier (35, 45) having planet gears (32, 42);

the sun gear (11) of the first front-mounted planetary gearset (VS1) is connected to the input drive shaft (1);

the coupled carriers (15', 15") of the first front-mounted planetary gear set (VS1) are locked;

the sun gears (31, 41) of the two rear-mounted planetary gear sets (NS1, NS2) are connected to one another, are connectable via the second shifting element (B) to the ring gear (13) of the first front-mounted planetary gearset (VS1), and are lockable via the third shifting element (C);

the ring gear (33) of the first rear-mounted planetary gearset (NS1) is connectable via the first shifting element (A) to the input drive shaft (1) and is lockable via the seventh shifting element (A');

the carrier (45) of the second rear-mounted planetary gearset (NS2) is connectable via the fourth shifting element (D) to the ring gear (13) of the first front-mounted planetary gearset (VS1), is connectable via the fifth shifting element (E) to the input drive shaft (1), and is lockable via the sixth shifting element (D'), in particular via the carrier (15") of the outer planet gears (12") of the first front-mounted planetary gear set (VS1); and the carrier (35) of the first rear-mounted planetary gearset (NS1) and the ring gear (43) of the second rear-mounted planetary gearset (NS2) are connected to one another and to the output drive shaft (3).

14. A multiple-ratio transmission, comprising:

a font-mounted gear set (VS) connected to an input drive shaft (1);

a rear-mounted gear set (NS) connected to an output drive shaft (2); and seven shifting elements (A, B, C, D, E, D', A');

wherein by selectable shifting of a maximum of the seven shifting elements (A, B, C, D, E, D', A'), an input rotation speed (n) of the input drive shaft (1) and rotation speeds generated in the front-mounted gear set are selectively transferable to the rear-mounted gear set (NS) for selection of at least seven forward speeds, so that only one shifting element, of two shifting elements presently actuated, is disengaged and one further shifting element is engaged to shift from one gear to a next higher or lower gear;

the front-mounted gear set (VS) has one of one front-mounted planetary gear set (VS1) and two coupled front-mounted planetary gear sets (VS1, VS2); and the rear-mounted gear set (NS) has a two-carrier four-shaft transmission having two shiftable rear-mounted planetary gear sets (NS1, NS2);

a first free shaft of the rear-mounted gear set (NS) is connected to the first shifting element (A) and rotating, when the first shifting element (A) is engaged, at a rotation speed less than or equal to the input rotation speed (n) of the input drive shaft;

a second free shaft of the rear-mounted gear set (NS) is connected to the second and third shifting elements (B, C);

a third free shaft of the rear-mounted gear set (NS) is connected to the fourth shifting element (D) and rotating, when the fourth shifting element (D) is engaged, at a rotation speed less than the input rotation speed (n) of the input shaft (1), the third free shaft of the rear-mounted gear set (NS) is connected to the fifth shifting element (E) and rotating, when the fifth shifting element (E) is engaged, at the input drive rotation speed (n) of the input shaft (1); and a fourth free shaft of the rear-mounted gear set (NS) is connected to the output drive shaft (2);

the third free shaft of the rear-mounted gear set (NS) is additionally connected to the sixth shifting element (D') and rotates, when the sixth shifting element (D') is engaged, at a rotation speed less than the input rotation speed (n) of the input shaft (1);

the first free shaft of the rear-mounted gear set (NS) is additionally connected to the seventh shifting element (A') and rotates, when the seventh shifting element (A') is engaged, at a rotation speed less than the input rotation speed (n) of the input drive shaft (1);

the first front-mounted planetary gearset (VS1) has a sun wheel (11), a ring gear (13), and two coupled carriers (15', 15") having inner and outer planet gears (12', 12");

the first rear-mounted planetary gearset (NS1) is a double-planet gear set having a sun gear (31), a ring gear (33), and two coupled carriers (35', 35") having inner and outer planet gears (32', 32");

the second rear-mounted planetary gear set (NS2) has a sun gear (41), a ring gear (43), and a carrier (45) having planet gears (42);

the sun gear (11) of the first front-mounted planetary gear set (VS1) is connected to the input drive shaft (1);

the coupled carriers (15', 15") of the first front-mounted planetary gear set (VS1) are locked;

the sun gear (31) of the first rear-mounted planetary gear set (NS1) is connectable via the first shifting element (A) to the input drive shaft (1) and is lockable via the seventh shifting element (A'), in particular via the carrier (15") of the outer planet gears (12") of the first front-mounted planetary gear set (VS1);

the sun gear (41) of the second rear-mounted planetary gear set (NS2) is connectable via the second shifting element (B) to the ring gear (13) of the first front-mounted planetary gear set (VS1) and is lockable is the third shifting element (C), in particular via the carrier (15") of the outer planet gears (12") of the first front-mounted planetary gear set (VS1);

the carrier (45) of the second rear-mounted planetary gear set (NS2) and the coupled carriers (35', 35") of the first rear-mounted planetary gear set (NS1) are connected to one another, are connectable via the fourth shifting element (D) to the ring gear (13) of the first front-mounted planetary gear set (VS1), are connectable via the fifth shifting element (E) to the input drive shaft (1), and are lockable via the sixth shifting element (D);

the sun gear (31) of the first rear-mounted planetary gear set (NS1) and the ring gear (43) of the second rear-mounted planetary gear set (NS2) are connected to one another; and the ring gear (33) of the first rear-mounted planetary gear set (NS1) is connected to the output drive shaft (3).

* * * * *